Figure 1:
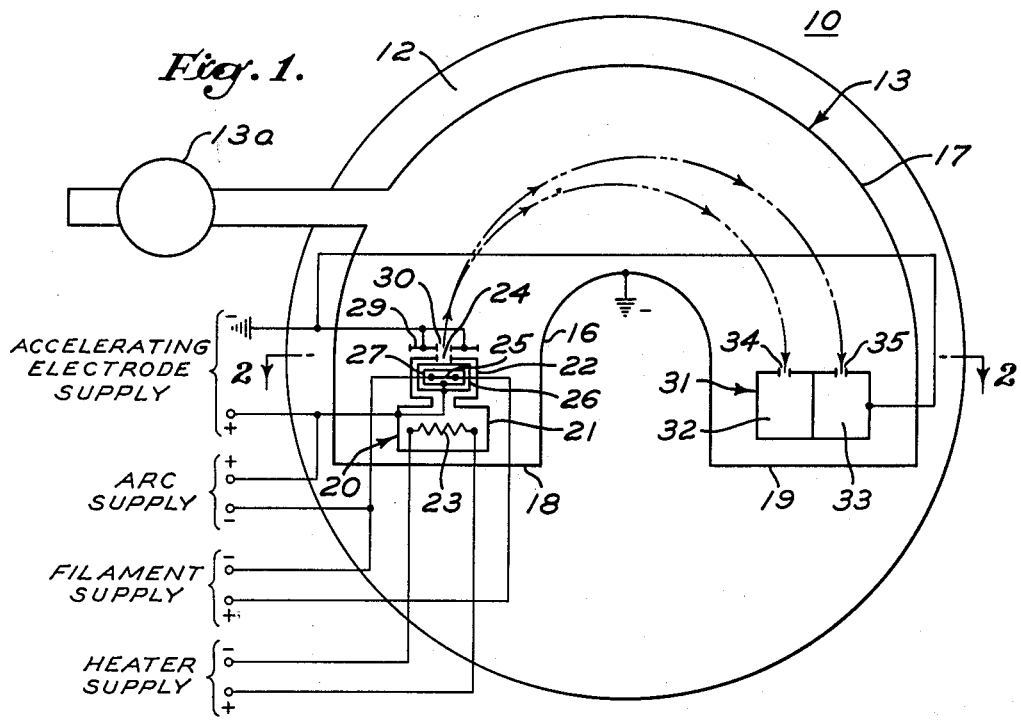

INVENTOR.
ERNEST O. LAWRENCE

Oct. 18, 1955   E. O. LAWRENCE   2,721,272
CALUTRONS
Filed Jan. 5, 1945   10 Sheets-Sheet 2

INVENTOR.
ERNEST O. LAWRENCE
BY
ATTORNEY.

Oct. 18, 1955 — E. O. LAWRENCE — 2,721,272
CALUTRONS
Filed Jan. 5, 1945 — 10 Sheets-Sheet 3

INVENTOR.
ERNEST O. LAWRENCE
BY
ATTORNEY.

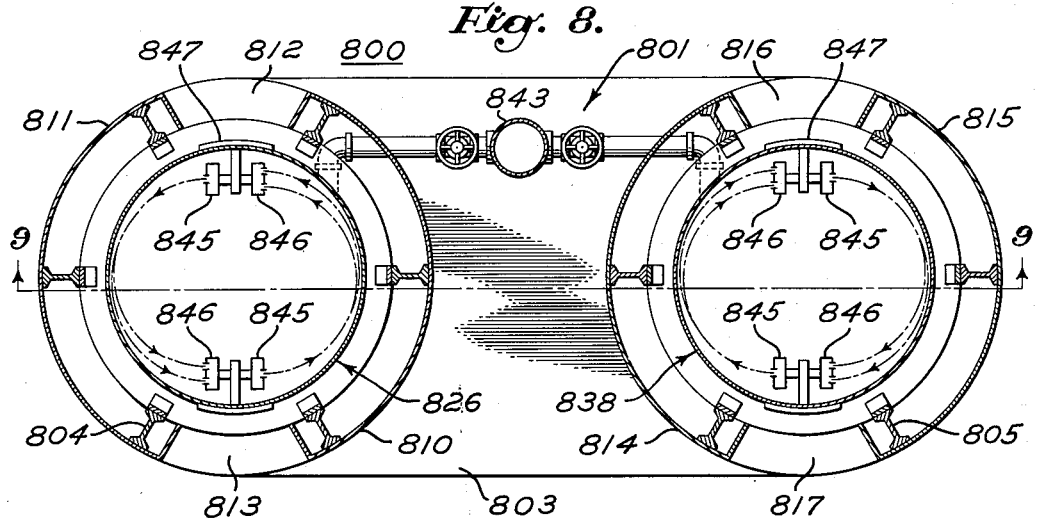
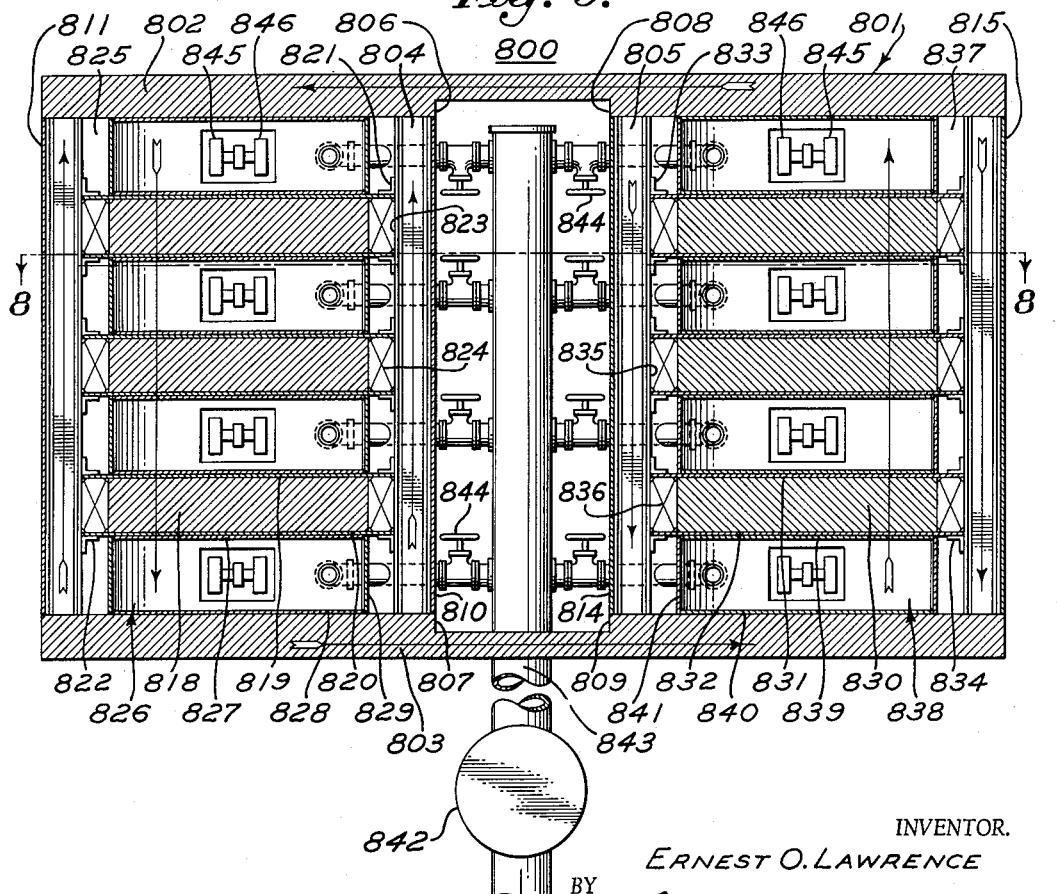

Oct. 18, 1955   E. O. LAWRENCE   2,721,272
CALUTRONS
Filed Jan. 5, 1945   10 Sheets-Sheet 7

INVENTOR.
ERNEST O. LAWRENCE
BY
ATTORNEY.

United States Patent Office 2,721,272
Patented Oct. 18, 1955

2,721,272

CALUTRONS

Ernest O. Lawrence, Berkeley, Calif., assignor to the United States of America as represented by the United States Atomic Energy Commission Application January 5, 1945, Serial No. 571,420

41 Claims. (Cl. 250—41.9)

The present invention relates to calutrons and more particularly to improvements in calutrons of the character disclosed in the copending application of Ernest O. Lawrence, Serial No. 557,784, filed October 9, 1944, now U. S. Patent No. 2,709,222.

At the outset, it is noted that a "calutron" is a machine of the character of that disclosed in the above-mentioned Lawrence application, and is employed to separate the constituent isotopes of an element and, more particularly, to increase the proportion of a selected isotope in an element containing several isotopes in order to produce the element enriched with the selected isotope. For example, the machine is especially useful in producing uranium enriched with $U^{235}$.

Such a calutron essentially comprises means for vaporizing a quantity of material containing an element that is to be enriched with a selected one of its several isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of the ions being proportional to the square roots of the masses of the ions, whereby the ions are concentrated in accordance with their masses; and means for de-ionizing and collecting the ions of the selected isotope thus concentrated, thereby to produce a deposit of the element enriched with the selected isotope.

It is an object of the invention to provide a calutron comprising a plurality of tanks and magnetic field structure associated with the tanks and arranged to set up a magnetic field therethrough.

Another object of the invention is to provide a calutron comprising a plurality of tanks and magnetic field structure associated with the tanks and arranged to set up a magnetic field through the tanks in series relation.

Another object of the invention is to provide a calutron comprising a plurality of tanks and magnetic field structure associated with the tanks and arranged to set up a magnetic field through the tanks in parallel relation.

Another object of the invention is to provide a calutron comprising a plurality of tanks and a plurality of interposed magnetic core members.

Another object of the invention is to provide in a calutron including a plurality of tanks and a plurality of interposed magnetic core members, an arrangement including a plurality of windings respectively carried by the core members for setting up a magnetic field through the tanks and the magnetic core members.

A further object of the invention is to provide in a calutron including a plurality of tanks and a plurality of interposed core members, an arrangement including a plurality of casings respectively carried by the core members and respectively housing windings for setting up a magnetic field through the tanks and the magnetic core members.

A further object of the invention is to provide a calutron comprising a plurality of tanks and a plurality of interposed core members arranged to form a closed geometric figure.

A further object of the invention is to provide a calutron comprising a plurality of tanks arranged in radially spaced-apart relation with respect to each other, and a plurality of magnetic core members arranged in radially spaced-apart relation with respect to each other and in interposed relation with respect to the tanks.

A further object of the invention is to provide in a calutron including a tank, an arrangement including a winding surrounding the tank for setting up a magnetic field therethrough.

A further object of the invention is to provide in a calutron including a plurality of tanks, an arrangement for selectively connecting the tanks to an associated evacuated header.

Figure 2:
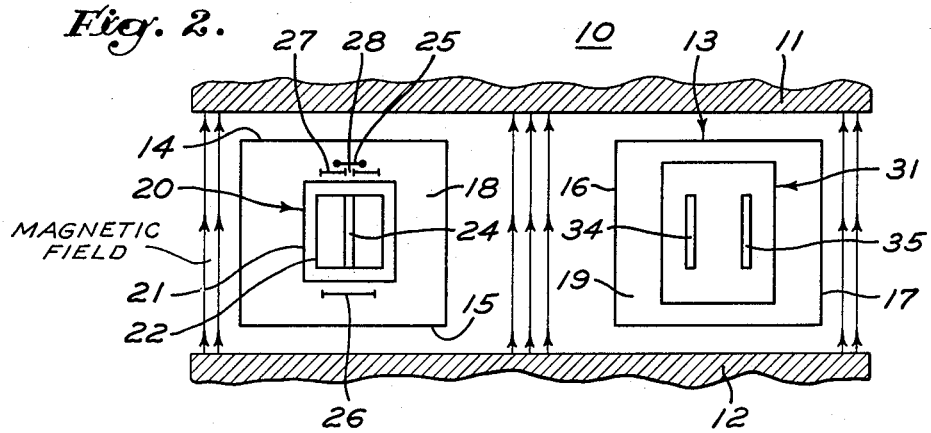
Figure 4:
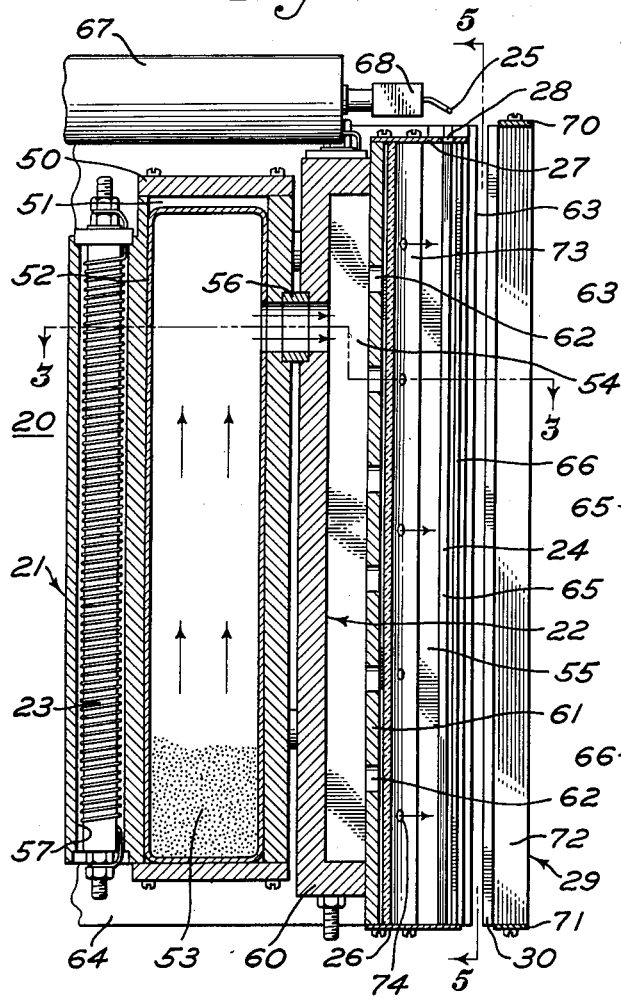
Figure 5:
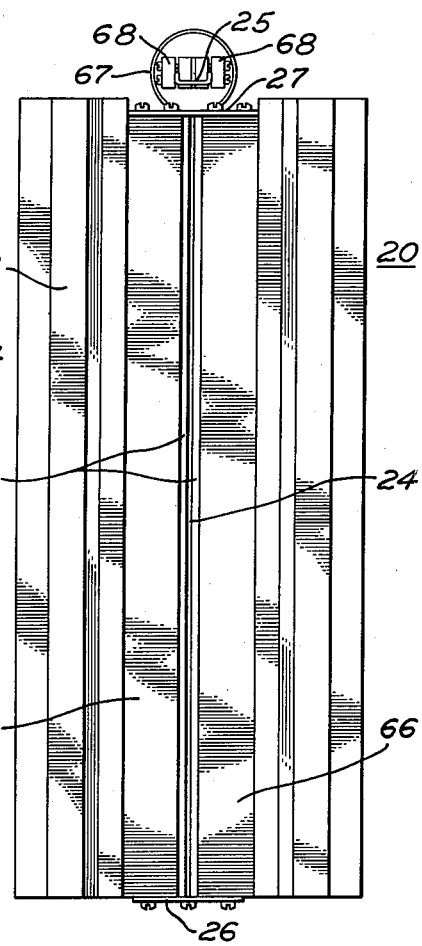
Figure 3:
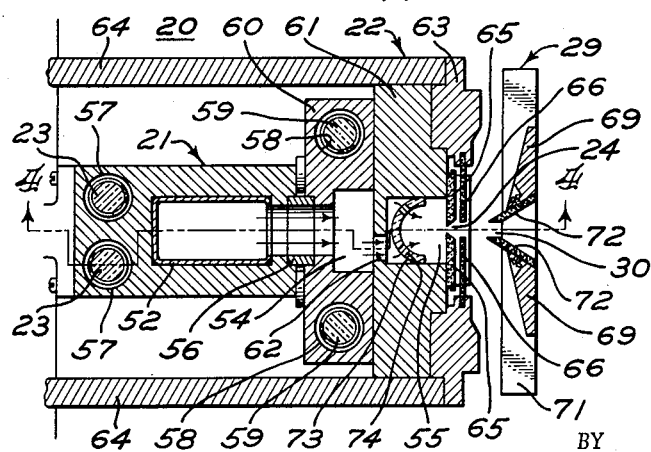
Figure 6:
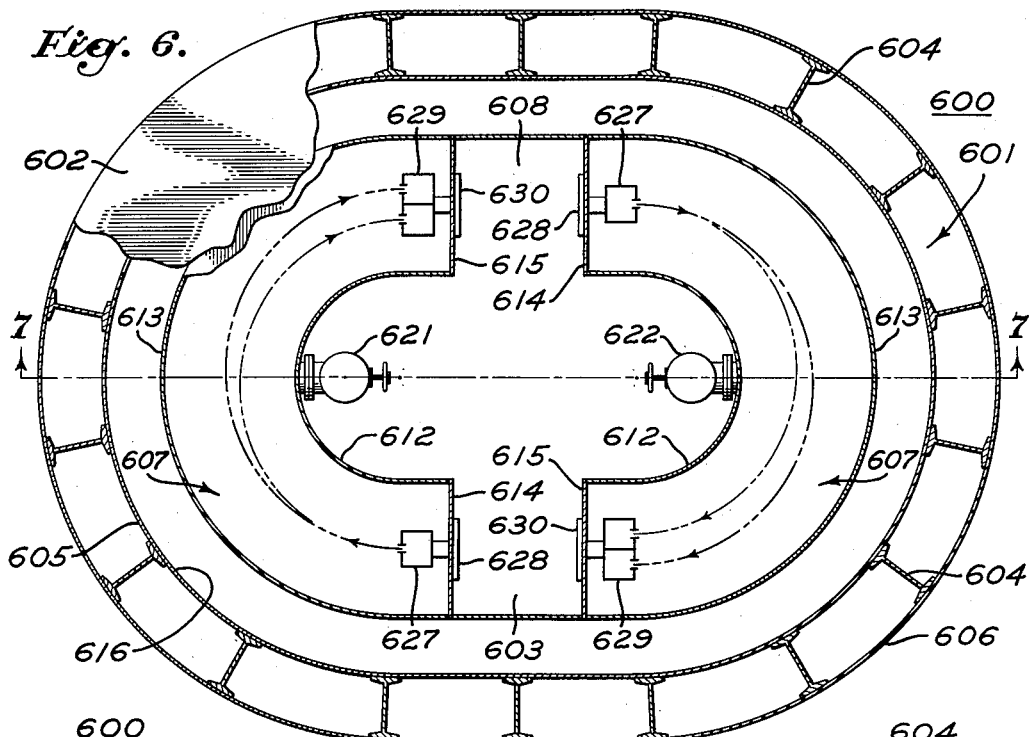
Figure 7:
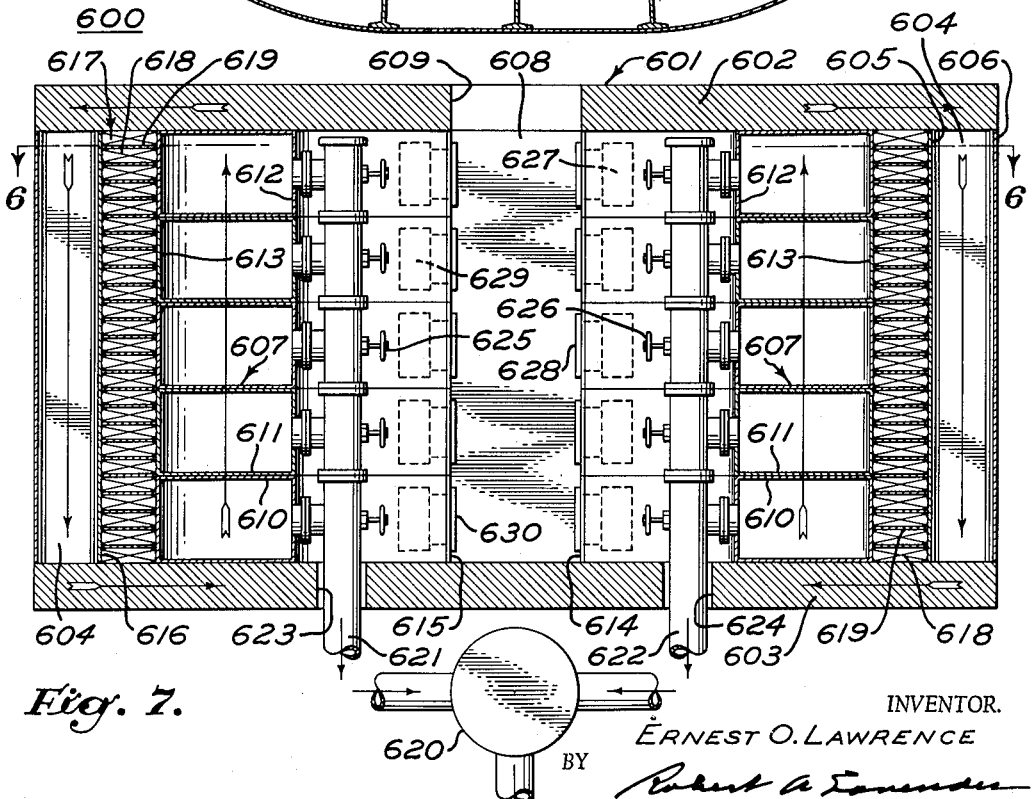
Figure 10:
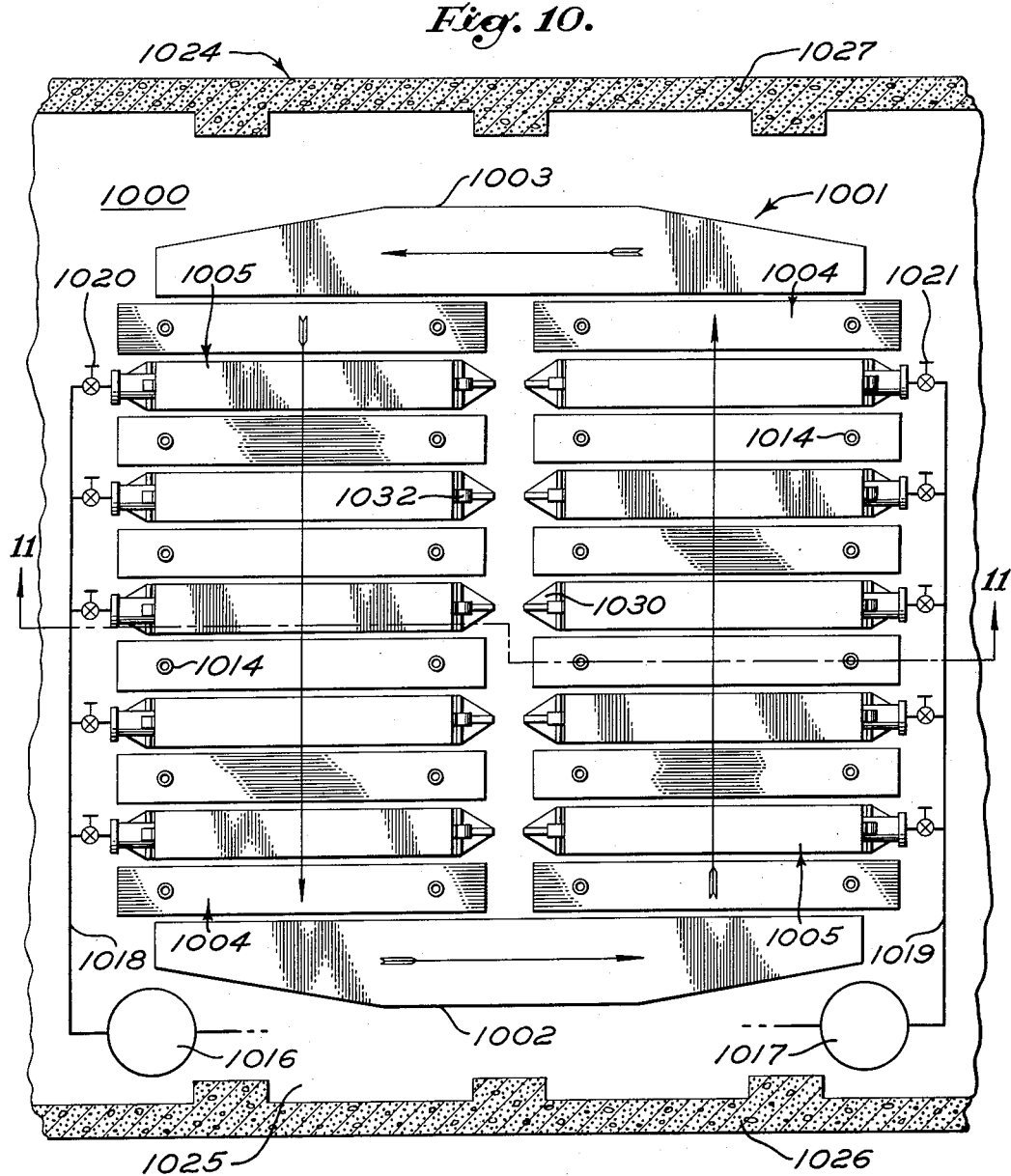
Figure 11:
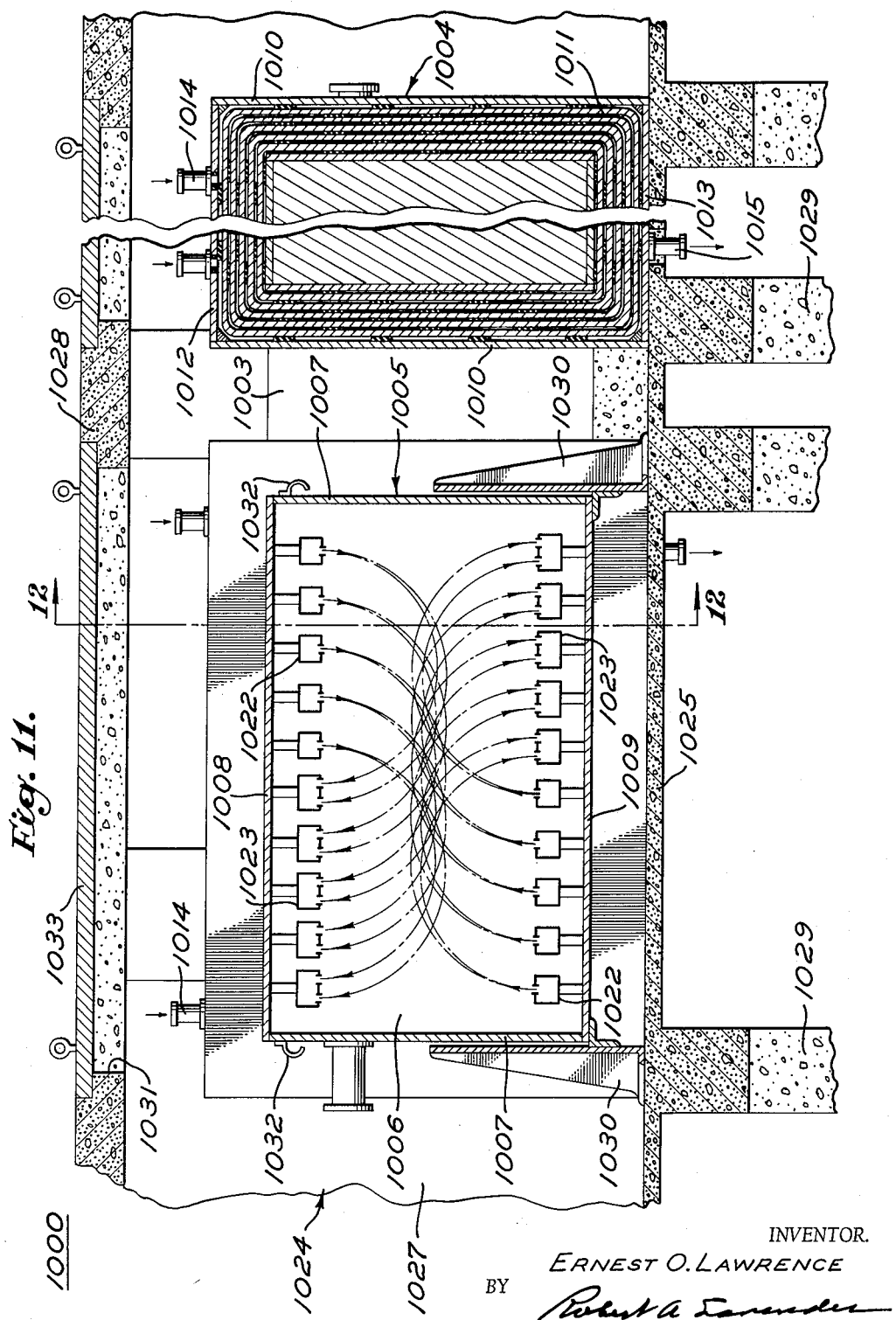
Figure 12:
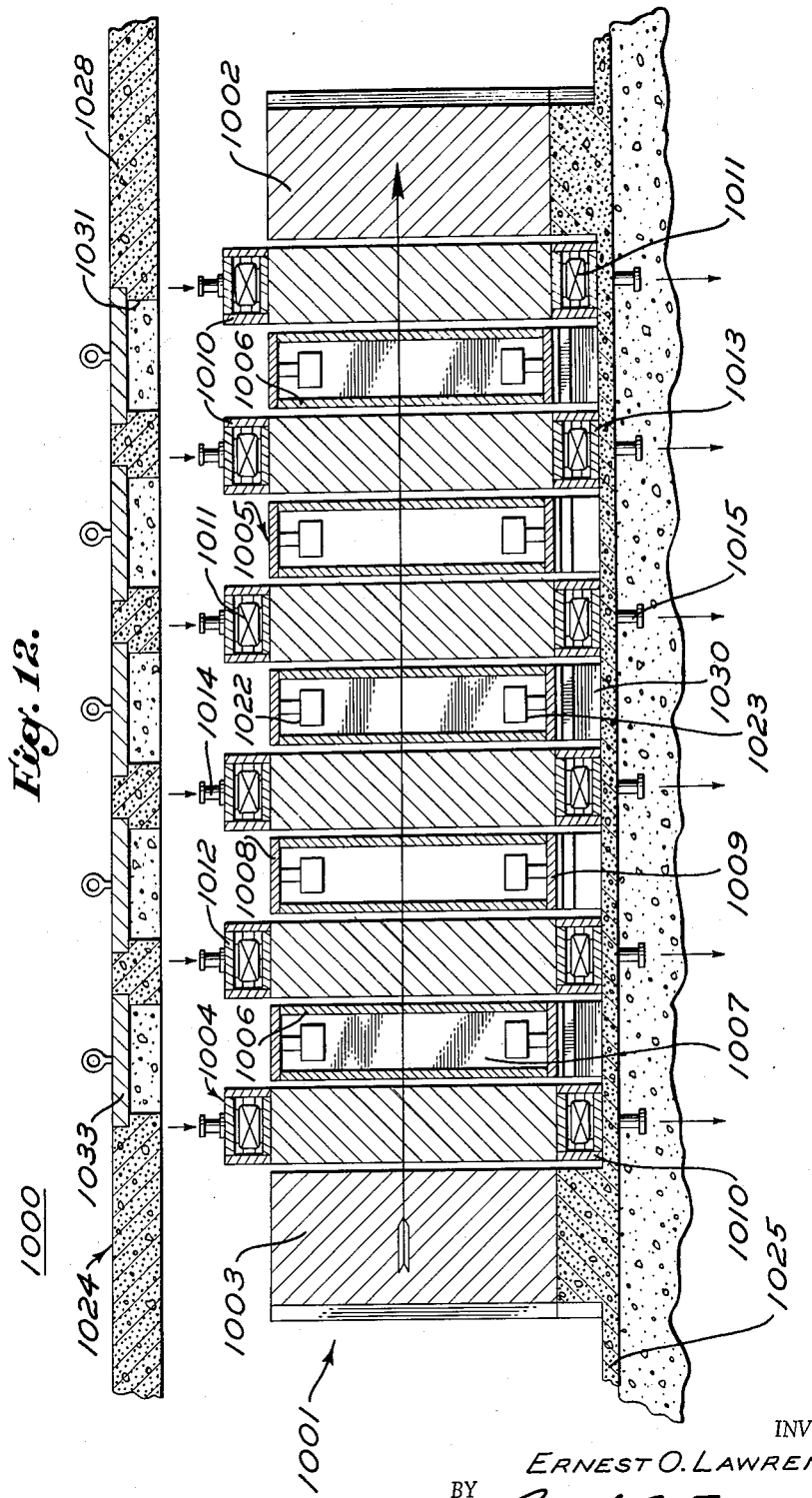
Figure 13:
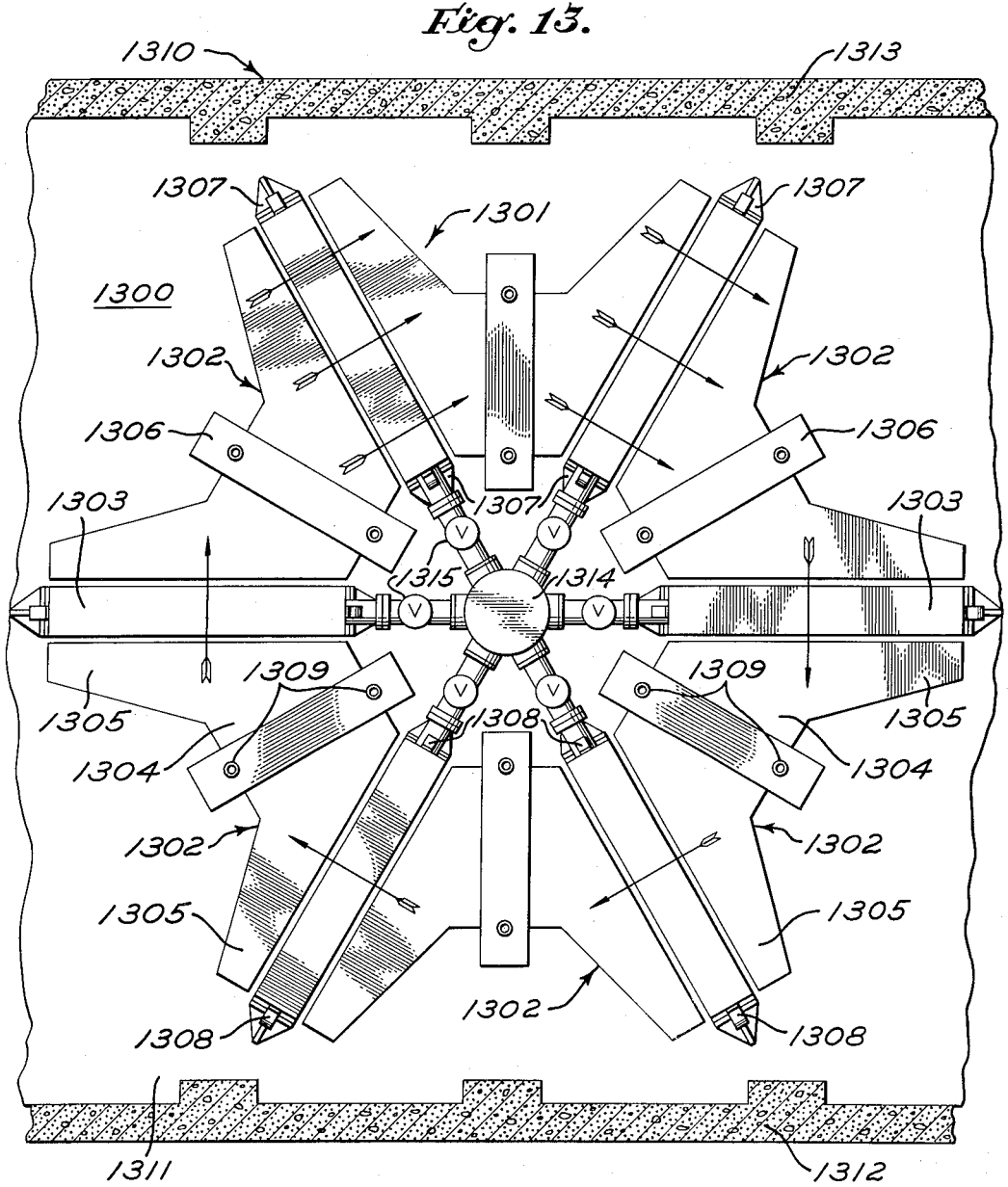
Figure 14:
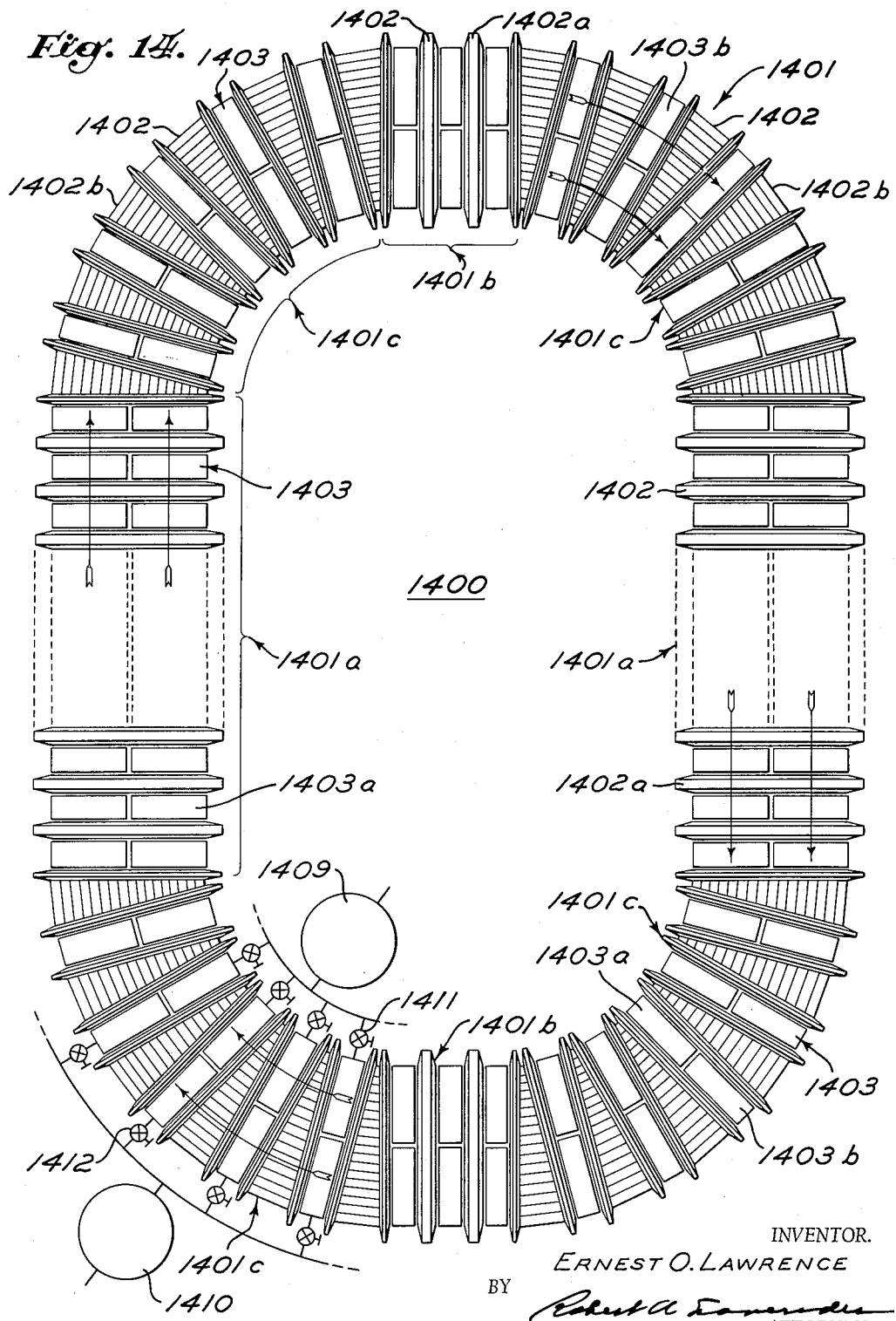
Figures 15, 16:
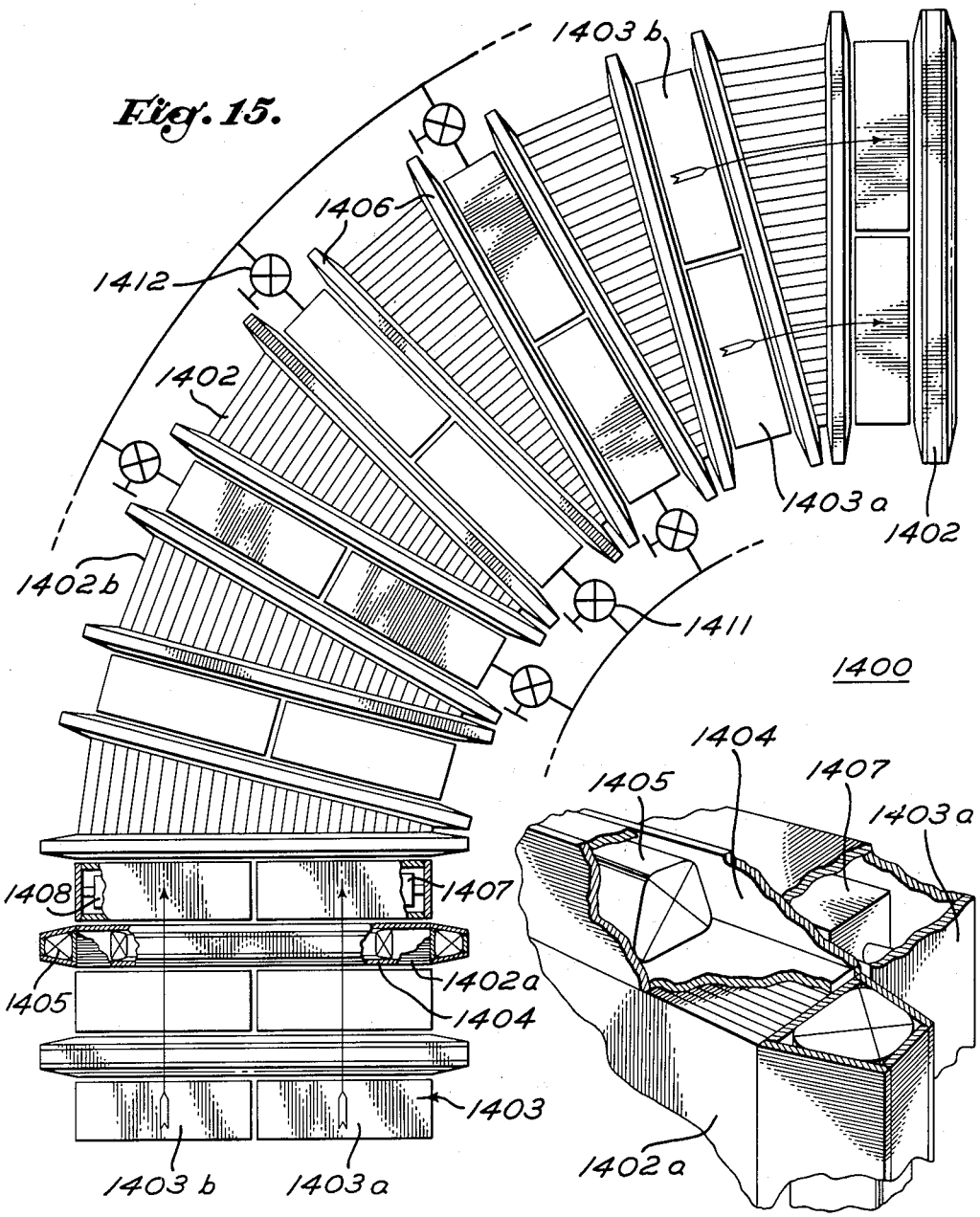

The invention, both as to its organization and method of operation, together with further objects and advantages thereof, will best be understood by reference to the following specification taken in connection with the accompanying drawings, in which Figure 1 is a diagrammatic plan view of a representative calutron; Fig. 2 is a diagrammatic sectional view of the calutron taken along the line 2—2 in Fig. 1; Fig. 3 is a transverse sectional view of an ion source unit incorporated in the calutron, taken along the line 3—3 in Fig. 4; Fig. 4 is a longitudinal sectional view of the ion source unit taken along the line 4—4 in Fig. 3; Fig. 5 is a front elevational view of the ion source unit shown in Figs. 3 and 4; Fig. 6 is a diagrammatic plan view, partly broken away, of one form of calutron embodying the present invention; Fig. 7 is a diagrammatic vertical sectional view of this calutron taken along the line 7—7 in Fig. 6; Fig. 8 is a diagrammatic horizontal sectional view of another form of calutron embodying the present invention, taken along the line 8—8 in Fig. 9; Fig. 9 is a diagrammatic vertical sectional view of this calutron taken along the line 9—9 in Fig. 8; Fig. 10 is a diagrammatic plan view of still another form of calutron embodying the present invention; Fig. 11 is a diagrammatic vertical sectional view of this calutron taken along the line 11—11 in Fig. 10; Fig. 12 is another diagrammatic vertical sectional view of this calutron taken along the line 12—12 in Fig. 11; Fig. 13 is a diagrammatic plan view of a further form of calutron embodying the present invention; Fig. 14 is a diagrammatic plan view of a still further form of calutron embodying the present invention; Fig. 15 is an enlarged diagrammatic plan view, partly broken away, of the upper left-hand portion of the calutron shown in Fig. 14; and Fig. 16 is a greatly enlarged fragmentary perspective view of a portion of the calutron shown in Fig. 15, illustrating the arrangement of the windings housed in the casings carried by the magnetic core members arranged in interposed relation with respect to the associated pairs of tanks.

Referring now more particularly to Figs. 1 and 2 of the drawings, there is illustrated a representative calutron 10 of the character noted, that comprises magnetic field structure including upper and lower pole pieces 11 and 12, provided with substantially parallel spaced-apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer side walls 16 and 17, and end walls 18 and 19. The end walls 18 and 19 close the opposite ends of the tubular tank 13 and are adapted to be removably secured in place, whereby the tank 13 is hermetically sealed. Also, vacuum pumping apparatus 13a is associated with the tank 13, whereby the interior of the tank 13 may be evacuated to a pressure of the order of $10^{-5}$ to $10^{-4}$ mm. Hg. Preferably, in the tank 13, the top and bottom walls 14 and 15 are formed of ordinary steel; while the inner and outer side walls 16 and 17, as well as the end walls 18 and 19, are formed of stainless steel. Also, the top and bottom walls 14 and 15 of the tank 13 are spaced a short distance from the pole faces of the upper and lower pole pieces 11 and 12 respectively, the tank 13 being retained in such position in any suitable manner, whereby the top and bottom walls 14 and 15 constitute in effect pole pieces with respect to the interior of the tank 13, as explained more fully hereinafter.

The removable end wall 18 suitably supports an ion source unit 20 comprising a charge receptacle 21 and a communicating arc-block 22. An electric heater 23 is arranged in heat exchange relation with the charge receptacle 21 and is adapted to be connected to a suitable source of heater supply, whereby the charge receptacle 21 may be appropriately heated, the charge receptacle 21 being formed of stainless steel or the like. The arc-block 22 is formed, at least partially, of brass or the like and is substantially C-shaped in plan, an upstanding slot 24 being formed in the wall thereof remote from the charge receptacle 21. Thus, the arc-block 22 is of hollow construction, the cavity therein communicating with the interior of the charge receptacle 21.

Also, the removable end wall 18 carries a filamentary cathode 25 adapted to be connected to a suitable source of filament supply, the filamentary cathode 25 overhanging the upper end of the arc-block 22 and arranged in alignment with respect to the upper end of the cavity formed therein. The arc-block 22 carries an anode 26 disposed adjacent the lower end thereof and arranged in alignment with respect to the cavity formed therein. Also, the arc-block 22 carries a collimating electrode 27 disposed adjacent the upper end thereof and having an elongated collimating slot 28 formed therethrough and arranged in alignment with respect to the filamentary cathode 25 as well as the anode 26 and the cavity formed in the arc-block 22. Both the anode 26 and the collimating electrode 27 are electrically connected to the source unit 20, which in turn is connected to the positive terminal of a suitable source of accelerating electrode supply, as explained more fully hereinafter. On the other hand, the tank 13 is grounded. Also, the filamentary cathode 25 and the cooperating anode 26 are adapted to be connected to a suitable source of arc supply.

Further, the removable end wall 18 carries ion accelerating structure 29, formed at least partially of tungsten or the like, and disposed in spaced-apart relation with respect to the wall of the arc-block 22 in which the slot 24 is formed. More specifically, a slit 30 is formed in the ion accelerating structure 29 and arranged in substantial alignment with respect to the slot 24 formed in the wall of the arc-block 22. The source of accelerating electrode supply is adapted to be connected between the arc-block 22 and the ion accelerating structure 29, the positive and negative terminals of the supply mentioned being respectively connected to the arc-block 22 and to the ion accelerating structure 29. Further, the negative terminal of the ion accelerating electrode supply is grounded.

The removable end wall 19 suitably supports an ion collector block 31 formed of stainless steel or the like, and provided with two laterally spaced-apart cavities or pockets 32 and 33 which respectively communicate with aligned slots 34 and 35 formed in the wall of the collector block 31 disposed remote from the removable end wall 19. It is noted that the pockets 32 and 33 are adapted to receive two constituent isotopes of an element which have been separated in the calutron 10, as explained more fully hereinafter. Finally, the collector block 31 is electrically connected to the ion accelerating structure 29. Thus it will be understood that the source unit 20 is connected to the positive ungrounded terminal of the accelerating electrode supply; while the tank 13, the ion accelerating structure 29 and the collector block 31 are connected to the negative grounded terminal of the accelerating electrode supply; the source unit 20 being electrically insulated from the component parts of the tank 13. Thus the portion of the tank 13 disposed between the ion accelerating structure 29 and the collector block 31 constitutes an electrostatic shield for the high-velocity ions traversing the curved paths between the slit 30 formed in the ion accelerating structure 29 and the slots 34 and 35 formed in the collector block 31, as explained more fully hereinafter.

Considering now the general principle of operation of the calutron 10, a charge comprising a compound of the element to be treated is placed in the charge receptacle 21, the compound of the element mentioned being one which may be readily vaporized. The end walls 18 and 19 are securely attached to the open ends of the tank 13, whereby the tank 13 is hermetically sealed. The various electrical connections are completed and operation of the vacuum pumping apparatus 13a associated with the tank 13 is initiated. When a pressure of the order of $10^{-5}$ to $10^{-4}$ mm. Hg is established within the tank 13, the electric circuits for the windings, not shown, associated with the pole pieces 11 and 12 are closed and adjusted, whereby a predetermined magnetic field is established therebetween traversing the tank 13. The electric circuit for the heater 23 is closed, whereby the charge in the charge receptacle 21 is heated and vaporized. The vapor fills the charge receptacle 21 and is conducted into the communicating cavity formed in the arc-block 22. The electric circuit for the filamentary cathode 25 is closed, whereby the filamentary cathode is heated and rendered electron emissive. Then the electric circuit between the filamentary cathode 25 and the anode 26 is closed, whereby an arc discharge is struck therebetween, electrons proceeding from the filamentary cathode 25 through the collimating slot 28 formed in the collimating electrode 27 to the anode 26. The collimating slot 28 formed in the collimating electrode 27 defines the cross section of the stream of electrons proceeding into the arc-block 22, whereby the arc discharge has a ribbon-like configuration and breaks up the molecular form of the compound of the vapor to a considerable extent, producing positive ions of the element that is to be enriched with the selected one of its isotopes.

The electric circuit between the arc-block 22 and the ion accelerating structure 29 is completed, the ion accelerating structure 29 being at a high negative potential with respect to the arc-block 22, whereby the positive ions in the arc-block 22 are attracted by the ion accelerating structure 29 and accelerated through the voltage impressed therebetween. More particularly, the positive ions proceed from the cavity formed in the arc-block 22 through the slot 24 formed in the wall thereof, and across the space between the ion accelerating structure 29 and the adjacent wall of the arc-block 22, and thence through the slit 30 formed in the ion accelerating structure 29. The high-velocity positive ions form a vertical upstanding ribbon or beam proceeding from the cavity formed in the arc-block 22 through the slot 24 and the aligned slit 30.

As previously noted, the collector block 31, as well as the tank 13, is electrically connected to the ion accelerating structure 29, whereby there is an electric-field-free path for the high-velocity positive ions disposed between the ion accelerating structure 29 and the collector block 31 within the tank 13. The high-velocity positive ions are deflected from their normal straight-line path and from a vertical plane passing through the slot 24 and the aligned slit 30, due to the effect of the relatively strong magnetic field maintained through the space within the tank 13 through which the positive ions travel, whereby the positive ions describe arcs, the radii of which are proportional to the square roots of the masses of the ions and consequently of the isotopes of the element mentioned. Thus, ions of the relatively light isotope of the element describe an interior arc of relatively short radius and are focused through the slot 34 into the pocket 32 formed in the collector block 31; whereas ions of the relatively heavy isotope of the element describe an exterior arc of relatively long radius and are focused through the slot 35 into the pocket 33 formed in the collector block 31. Accordingly, the ions of the relatively light isotope of the element are collected in the pocket 32 and are de-ionized to produce a deposit of the relatively light isotope of the element therein; while the ions of the relatively heavy isotope of the element are collected in the pocket 33 and are de-ionized to produce a deposit of the relatively heavy isotope of the element therein.

After all of the charge in the charge receptacle 21 has been vaporized, all of the electric circuits are interrupted and the end wall 18 is removed so that another charge may be placed in the charge receptacle 21 and subsequently vaporized in the manner explained above. After a suitable number of charges have been vaporized in order to obtain appropriate deposits of the isotope of the element in the pockets 32 and 33 of the collector block 31, the end wall 19 is removed and the deposits of the collected isotopes in the pockets 32 and 33 in the collector block 31 are reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection reference is again made to the copending application of Ernest O. Lawrence, for a complete specification of a calutron especially designed for the production of uranium enriched with the isotope $U^{235}$. By way of illustration, it is noted that when the calutron 10 is employed in order to produce uranium enriched with $U^{235}$, the compound of uranium which is suggested as a suitable charge in the charge receptacle 21 is $UCl_4$, as this compound may be readily vaporized and the molecular form of the vapor may be readily broken up to form positive ions of uranium with great facility. In this case, uranium enriched with $U^{235}$ is collected in the pocket 32 of the collector block 31, and uranium comprising principally $U^{238}$ is collected in the pocket 33 of the collector block 31. Also, it is noted that from a practical standpoint, the deposit of uranium collected in the pocket 32 of the collector block 31 contains considerable amounts of $U^{238}$, in view of the fact that this isotope comprises the dominant constituent of normal uranium. Furthermore, the deposit of uranium collected in the pocket 32 of the collector block 31 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 32 of the collector block 31 is considerably enriched, both with $U^{234}$ and with $U^{235}$, and considerably impoverished with respect to $U^{238}$ as compared to natural or normal uranium.

Referring now more particularly to Figs. 3 to 5, inclusive, of the drawings, there are illustrated the structural details of the ion source unit 20 which is arranged in the magnetic field between the pole pieces of the calutron in the manner previously explained, the source unit 20 comprising the charge receptacle 21 and the arc-block 22. The charge receptacle 21 comprises wall structure, including a removable cover 50, defining an upstanding cavity 51 therein, that is adapted to receive a removable charge bottle 52 containing a charge 53 which is to be vaporized. The arc-block 22 comprises wall structure defining an upstanding distributing chamber 54 and an upstanding arc chamber 55 therein, the cavity 51 communicating with the distributing chamber 54 through a tubular member 56 supported by the wall structure of the charge receptacle 21 and the wall structure of the arc-block 22. The wall structure of the charge receptacle 21 has two upstanding cavities 57 formed therein, in which two elements of the electric heater 23 are arranged. Preferably, each element of the electric heater 23 comprises a coil of resistance wire wound on a supporting insulator, as indicated, whereby each element of the electric heater 23 may be independently placed in and removed from the associated cavity 57. Thus, the charge receptacle 21, and consequently the charge bottle 52, may be appropriately heated in order to vaporize the charge 53 contained in the charge bottle 52. Similarly, the arc-block 22 has two upstanding cavities 58 formed therein, in which two electric heating elements 59 are arranged. Preferably, each of the electric heating elements 59 comprises a coil of resistance wire wound on a supporting insulator, as indicated, whereby each of the electric heating elements 59 may be independently placed in and removed from the associated cavity 58. Thus, the arc-block 22, and more particularly the distributing chamber 54 therein, may be heated in order to prevent condensation of the contained vapor, as explained more fully hereinafter.

More particularly, the wall structure of the charge receptacle 21 is formed of copper or brass; and the wall structure of the arc-block 22 is formed of copper or brass and comprises two primary members 60 and 61. The distributing chamber 54 and the cavities 58 are formed in the member 60; while the arc chamber 55 is formed in the member 61, a series of longitudinally spaced-apart openings 62 being formed in the wall of the member 61 and communicating between the distributing chamber 54 and the arc chamber 55. Also, the arc-block 22 comprises a front plate 63 formed of copper or brass and secured to the member 61; the source unit 20 being supported by two rearwardly extending arms 64 which are secured to the member 61 and the front plate 63.

Two upstanding strips 65, formed of tungsten or the like, are secured to the member 61 adjacent the arc chamber 55, thereby to define an upstanding slot therebetween communicating with the arc chamber 55. Also, two upstanding strips 66, formed of tungsten or the like, are secured to the front plate 63 adjacent the strips 65 and spaced a small distance forwardly with respect thereto, thereby to define an upstanding slot between the strips 66 communicating with the arc chamber 55. Thus, the slot defined between the strips 65 and the slot defined between the strips 66 constitute the upstanding slot 24 formed in the front wall of the arc-block 22 and communicating with the arc chamber 55.

The filamentary cathode 25 is supported by cathode structure 67 arranged in cooperating relation with respect to the arc-block 22, the cathode structure 67 including two terminals 68. The opposite ends of the filamentary cathode 25 are removably clamped in place by the respective terminals 68, and the two terminals are connected to the source of filament supply, as previously noted. The central portion of the filamentary cathode 25 overhangs the central portion of the top wall of the arc-block 22; and the collimating electrode 27 is secured to the top wall of the arc-block 22, the collimating electrode 27 having the transverse slot 28 formed therein, as previously noted, and communicating with the arc chamber 55. More particularly, the filamentary cathode 25 is spaced a short distance above the collimating electrode 27, the central portion of the filamentary cathode 25 being arranged in alignment with the transverse slot 28 formed in the collimating electrode 27. Also, the anode 26 is secured to the bottom wall of the arc-block 22 adjacent the lower end of the arc chamber 55, and in alignment with the central portion of the filamentary cathode 25 and the transverse slot 28 formed in the collimating electrode 27.

The negative and positive terminals of the arc supply are respectively connected to the filamentary cathode 25 and to the arc-block 22, the anode 26 and the collimating electrode 27 being connected together by the arc-block 22 and consequently to the positive terminal of the arc supply mentioned, as previously noted. Further, the ion accelerating structure 29 comprises two upstanding strips 69 disposed forwardly of the strips 66 and secured to two transversely-extending top and bottom members 70 and 71 to form a unitary structure. The two strips 69 are arranged in transverse spaced-apart relation and carry two electrodes 72, formed of tungsten or the like. The two electrodes 72 are arranged in transverse spaced-apart relation to define the upstanding slit 30 therebetween, and arranged in alignment with the slot 24 formed in the front wall of the arc-block 22.

As previously noted, the ion accelerating structure 29, together with the source unit 20, is supported by the removable end wall 18 of the calutron 10, and the positive and negative terminals of the accelerating electrode supply are respectively connected to the arc-block 22 and the ion accelerating structure 29. Finally, an upstanding semi-circular baffle plate 73, formed of quartz or the like, is arranged in the arc chamber 55, and has a series of longitudinally spaced-apart openings 74 formed therein.

Considering now the detailed operation of the ion source unit 20, when the electric circuit for the heater 23 is completed the charge receptacle 21 and consequently the charge bottle 52 are heated, whereby the charge 53 is vaporized, filling the cavity in the charge bottle 52. The vapor passes through the tubular member 56 into the distributing chamber 54, whereby this chamber is filled with the vapor. The vapor is distributed in the distributing chamber 54 and passes through the openings 62 formed in the wall of the member 61 into the rear part of the arc chamber 55. The vapor then passes through the openings 74 formed in the baffle plate 73, into the front part of the arc chamber 55, whereby this part of the arc chamber 55 is filled with the vapor. More particularly, the arc chamber 55 is thoroughly and substantially uniformly filled with the vapor to be ionized, due to the arrangement of the distributing chamber 54 and the baffle plate 73.

When the circuit for the filamentary cathode 25 is completed, the filamentary cathode is heated and rendered electron emissive; and when the arc supply circuit is completed between the filamentary cathode 25 and the arc-block 22, electrons are projected from the central portion of the filamentary cathode 25 toward the collimating electrode 27. More particularly, some of these electrons pass through the transverse slot 28 formed in the collimating electrode 27, into the arc chamber 55, and proceed toward the anode 26. Accordingly, the collimating electrode 27 causes a stream of electrons having a ribbon-like configuration to be projected through the arc chamber 55, whereby the vapor in the arc chamber is ionized. When the accelerating electrode supply circuit is completed, the positive ions produced in the arc chamber 55 are drawn through the upstanding slot 24 formed in the front wall of the arc-block 22 by the associated ion accelerating structure 29, to form a beam of positive ions having an upstanding substantially ribbon-like configuration proceeding through the slit 30 between the electrodes 72; which beam of positive ions is projected through the evacuated tank space toward the cooperating collector block 31, in the manner previously explained.

In view of the foregoing description, it will be understood that the calutron 10 comprises the single tank 13, arranged in the single gap formed in the associated magnetic field structure including the pole pieces 11 and 12.

Referring now more particularly to Figs. 6 and 7 of the drawings, there is illustrated a calutron 600, embodying the features of the present invention and comprising hollow field structure 601 including upper and lower magnetic yokes 602 and 603 arranged in vertically spaced-apart relation. The yokes 602 and 603 are substantially oval in plan and are retained in assembled relation by an arrangement including a plurality of upstanding steel I-beams 604 extending therebetween and disposed in spaced-apart relation adjacent the marginal edges of the yokes 602 and 603. Also, upstanding inner and outer steel plates 605 and 606 are arranged between the yokes 602 and 603, respectively interiorly and exteriorly of the upstanding I-beams 604 and secured thereto. Accordingly, the inner and outer plates 605 and 606 define an upstanding compartment, substantially oval in plan, extending between the upper and lower yokes 602 and 603 and housing the upstanding I-beams 604. Thus, the upper and lower yokes 602 and 603 are retained in position by hollow magnetic structure extending therebetween and including the upstanding I-beams 604 and the inner and outer plates 605 and 606; and this hollow magnetic structure together with the upper and lower yokes 602 and 603 comprises the hollow field structure 601, which has a drum-like configuration.

Also, the calutron 600 comprises two substantially parallel rows of tanks 607, housed within the hollow field structure 601 and disposed between the upper and lower yokes 602 and 603. In the arrangement illustrated, each row of tanks 607 comprises five individual tanks arranged in vertically stacked relation between the yokes 602 and 603, the two parallel rows of vertically stacked tanks 607 being spaced laterally from each other to provide an upstanding passageway 608 therebetween, the passageway 608 being arranged within and extending transversely of the field structure 601. The passageway 608 constitutes a compartment disposed within the field structure 601 adjacent the center thereof and between the upper and lower yokes 602 and 603. This passageway 608 is rendered accessible from the exterior of the field structure 601 by an arrangement including a transversely extending opening 609 formed in the upper yoke 602, and is utilized for a purpose more fully explained hereinafter.

Preferably, the tanks 607 are identical, each being of tubular configuration. More particularly, each of the tanks 607 is substantially crescent-shaped in plan and substantially rectangular in vertical section and comprises substantially flat parallel spaced-apart top and bottom walls 610 and 611, upstanding curved inner and outer side walls 612 and 613, and end walls 614 and 615. In each tank 607 the end walls 614 and 615 are adapted to be removably secured in place, whereby the tank 607 is substantially fluid-tight. Preferably, in each tank 607 the top and bottom walls 610 and 611 are formed of ordinary steel; while the inner and outer side walls 612 and 613, as well as the end walls 614 and 615, are formed of stainless steel. Also, the top and bottom walls 610 and 611 constitute in effect pole pieces with respect to the interior of the tank 607, as explained more fully hereinafter.

Considering in greater detail the arrangement of the two parallel rows of vertically stacked tanks 607 disposed between the upper and lower yokes 602 and 603 within the field structure 601, it is noted that in each row the individual tanks 607 are substantially congruent and that the aligned outer walls 613 of the tanks in the two vertical rows are spaced inwardly from the inner plate 605, whereby there is defined within the field structure 601, mutually between the upper and lower yokes 602 and 603 and between the inner plate 605 and the outer walls 613 of the individual tanks in the two vertical rows, an upstanding compartment 616, substantially oval in plan. In this compartment or space 616 there is arranged an upstanding tubular winding 617 that is adapted to be connected to a suitable source of current supply, not shown. Thus, the winding 617 arranged in the space 616 disposed mutually between the upper and lower yokes 602 and 603 and between the inner plate 605 and the two parallel rows of vertically stacked tanks 607 constitutes a solenoid surrounding the two parallel rows of vertically stacked tanks 607 and is adapted when energized to set up a magnetic field in the field structure 601 which traverses the tanks 607, as explained more fully hereinafter.

The winding 617 comprises a plurality of individual winding coil sections 618 arranged in vertically stacked relation between the upper and lower yokes 602 and 603 and connected in series circuit relation. The individual winding coil sections 618 are retained in position in vertically stacked relation by an arrangement comprising a plurality of interposed substantially oval shaped magnetic plates 619, constituting winding keys, carried by the inner plate 605. The winding keys 619 are secured to the inner surface of the inner plate 605 and extend inwardly in substantially parallel vertically spaced-apart relation toward the interior of the field structure 601, the inner edges of the winding keys 619 terminating immediately adjacent the outer walls 613 of the vertically stacked tanks 607 in the two parallel rows.

When the winding 617 is energized, magnetic flux is set up in the field structure 601, extending downwardly through the hollow magnetic structure comprising the I-beams 604 and the inner and outer plates 605 and 606 into the marginal portion of the lower yoke 603. The magnetic flux continues from the marginal portion of the lower yoke 603 inwardly toward the center thereof and then upwardly through the two parallel rows of vertically stacked tanks 607 into the upper yoke 602 adjacent the center portion thereof. Further, the magnetic flux continues from the center portion of the upper yoke 602 outwardly toward the marginal portion thereof and then downwardly into the hollow magnetic structure mentioned, thereby completing the magnetic circuit.

In view of the above description of the circuit of the magnetic flux in the field structure 601 and through the tanks 607, it will be understood that the two parallel rows of vertically stacked tanks 607 are arranged in parallel magnetic circuit relationship between the upper and lower yokes 602 and 603, and that the individual tanks 607 in each vertically stacked row are arranged in series magnetic circuit relationship with respect to each other in the row. Thus, the magnetic flux entering the bottom wall 611 of any individual first tank 607 is distributed thereby substantially uniformly and permeates the tank space therein, entering the top wall 610 of the first tank 607 and continuing into the bottom wall 611 of the adjacent individual second tank 607 disposed thereabove.

Also, the calutron 600 comprises vacuum pumping apparatus 620 commonly associated with the vertically stacked tanks 607 in the two parallel rows, whereby the interior of each individual tank 607 may be evacuated to a pressure of the order of $10^{-5}$ to $10^{-4}$ mm. Hg. More particularly, the vacuum pumping apparatus 620 is arranged exteriorly of the field structure 601 and is connected to two upstanding headers 621 and 622, respectively extending through openings 623 and 624 formed in the lower yoke 603 into the interior of the field structure 601, the two upstanding headers 621 and 622 being disposed on opposite sides of the passageway 608, respectively adjacent the outer walls 612 of the vertically stacked tanks 607 in the two parallel rows. The tanks 607 in the vertical row on the left-hand side of the calutron 600 are operatively connected to the upstanding header 621 by a conduit arrangement including a plurality of manually operable valves 625 individual to the tanks 607, whereby each of the individual tanks 607 in this row may be selectively connected to and disconnected from the associated upstanding header 621 by manipulation of the individually associated valve 625. Similarly, the tanks 607 in the vertical row on the right-hand side of the calutron 600 are operatively connected to the upstanding header 622 by a conduit arrangement including a plurality of manually operable valves 626 individual to the tanks 607, whereby each of the individual tanks 607 in this row may be selectively connected to and disconnected from the associated upstanding header 622 by manipulation of the individually associated valve 626. Thus it will be understood that each individual tank 607 in each of the two rows may be selectively connected to and disconnected from the associated upstanding header, which is evacuated by the vacuum pumping apparatus 620.

Finally, the calutron 600 comprises a plurality of ion beam transmitters 627 of the general construction and arrangement of the transmitter 20, respectively carried by plates 628 respectively removably secured to the end walls 614 of the individual tanks 607, and housed therein; and a plurality of ion beam receivers 629, respectively carried by plates 630 respectively removably secured to the end walls 615 of the individual tanks 607, and housed therein. The transmitters 627 and the receivers 629 are arranged in matched pairs in the individual tanks 607. Of course it will be understood that the general principle of operation of the calutron 600 is the same as that of the calutron 10, each transmitter 627 transmitting an ion beam through the evacuated space in the associated tank 607 transversely of the magnetic field traversing this tank space to the associated receiver 629; the respective lighter and heavier isotopes of the element treated are disposed at inner and outer boundaries of the ion beam adjacent the receiver 629, whereby the respective lighter and heavier isotopes of the element treated are respectively collected in the two pockets of the receiver 629; all in the manner previously explained.

As previously noted, the passageway 608 disposed within the central portion of the field structure 601 is accessible from the exterior through an opening 609 formed in the upper yoke 602; and this passageway 608 is sufficiently large to accommodate the entry of one or more operators thereinto, whereby the operators in the passageway 608 may readily manipulate the valves 625 and 626 and make necessary repairs and adjustments in connection with the transmitters 627 and the receivers 629. More particularly, any one of the plates 628 carrying the associated transmitter 627 may be removed from the associated end wall 614 into the passageway 608 when it is necessary to adjust or repair the transmitter 627; and any one of the plates 630 carrying the associated receiver 629 may be removed from the associated end wall 615 into the passageway 608 when it is necessary to adjust or repair the receiver 629. Furthermore, any one of the end walls 614 or 615 may be removed from the associated tank 607 into the passageway 608 when it is necessary to gain access to the interior of the tank 607. Of course it will be understood that before any one of the individual tanks 607 is opened by removal of the associated plate 628 or 630 or by removal of one of the end walls 614 or 615, this tank 607 is disconnected from the associated header 621 or 622 by closing the valve 625 or 626 individual thereto. Finally, it will be understood that an operator may readily replace, in a reverse manner, in any one of the tanks 607 the transmitter 627 or the receiver 629 and again connect the tanks 607 to the associated header 621 or 622 for further operation.

In view of the foregoing description of the construction and arrangement of the calutron 600 in conjunction with the mode of operation thereof, it will be understood that in the field structure 601 great economy is made of space by virtue of the compact arrangement of the tanks 607 therein. Accordingly, the calutron 600 has an isotope separating capacity of the order of ten times that of the calutron 10, although it is only of somewhat larger dimensions and requires only somewhat larger associated vacuum pumping apparatus. Moreover, in the calutron 600, the equipment commonly associated with the individual tanks 607, such for example as the vacuum pumping apparatus 620, is utilized very efficiently in view of the fact that this common equipment may be operated continuously in spite of the fact that one or more of the individual tanks 607 has been removed from operation in the system for the purpose of adjustment or repair.

Referring now more particularly to Figs. 8 and 9 of the drawings, there is illustrated a calutron 800, embodying the features of the present invention and comprising field structure 801 including upper and lower magnetic yokes 802 and 803, arranged in vertically spaced-apart relation. The yokes 802 and 803 are substantially oval in plan and are retained in assembled relation by an arrangement including two groups of upstanding steel I-beams 804 and 805 extending therebetween and disposed in spaced-apart relation respectively adjacent the left-hand and right-hand ends of the yokes 802 and 803. More particularly, the I-beams 804 are arranged in radially spaced-apart relation about a circle and extend between two circular inwardly directed bosses 806 and 807, respectively carried by the upper and lower yokes 802 and 803 adjacent the left-hand ends thereof; while the I-beams 805 are arranged in radially spaced-apart relation about a circle and extend between two circular inwardly directed bosses 808 and 809, respectively carried by the upper and lower yokes 802 and 803 adjacent the right-hand ends thereof.

Specifically, as illustrated, the first group of I-beams 804 includes six individual I-beams; and two upstanding curved inner and outer steel plates 810 and 811 are arranged between the bosses 806 and 807, the inner plate 810 embracing and being secured to the three innermost I-beams 804 in this group, and the outer plate 811 embracing and being secured to the three outermost I-beams 804 in this group. Thus, the first group of I-beams 804, together with the inner and outer plates 810 and 811, defines first hollow magnetic structure extending between the bosses 806 and 807 respectively carried by the left-hand ends of the upper and lower yokes 802 and 803. The extremities of the inner and outer plates 810 and 811 are flanged inwardly to provide two diametrically disposed openings 812 and 813 into the first hollow magnetic structure, whereby access may be gained to the interior thereof for a purpose more fully explained hereinafter.

Also, as illustrated, the second group of I-beams 805 includes six individual I-beams; and two upstanding inner and outer steel plates 814 and 815 are arranged between the bosses 808 and 809, the inner plate 814 embracing and being secured to the three innermost I-beams 805 in this group, and the outer plate 815 embracing and being secured to the three outermost I-beams 805 in this group. Thus, the second group of I-beams 805, together with the inner and outer plates 814 and 815 defines second hollow magnetic structure extending between the bosses 808 and 809 respectively carried by the right-hand ends of the upper and lower yokes 802 and 803. The extremities of the inner and outer plates 814 and 815 are flanged inwardly to provide two diametrically disposed openings 816 and 817 into the second hollow magnetic structure, whereby access may be gained to the interior thereof for a purpose more fully explained hereinafter.

Arranged within the first hollow magnetic structure defined by the first group of upstanding I-beams 804 are a plurality of substantially disk-shaped magnetic core members 818, disposed in vertically spaced-apart relation between the upper and lower yokes 802 and 803. In the arrangement illustrated, three core members 818 are disposed within the first hollow magnetic structure; and each of the core members 818 is retained in position by an arrangement including upper and lower substantially circular plates 819 and 820, respectively engaging the upper and lower surfaces of the core member 818 and respectively secured to the individual I-beams 804 by two groups of angular brackets 821 and 822. The diameter of each core member 818 is less than the internal diameter of the first hollow magnetic structure defined by the first group of I-beams 804, thereby to define a substantially annular space 823 mutually between the periphery of the core member 818 and the inner edges of the upstanding I-beams 804 and between the upper and lower plates 819 and 820; in which space there is arranged a substantially tubular winding coil 824. Thus, each winding coil 824 embraces the associated core member 818 and is retained in position between the associated upper and lower plates 819 and 820 in engagement with the inner edges of the upstanding I-beams 804. The three windings 824 carried by the three core members 818 are connected in series circuit relationship in order to set up magnetic flux in the field structure 801 in a manner more fully explained hereinafter.

The arrangement of the three core members 818 in vertically spaced-apart relation within the first hollow magnetic structure defines four upstanding substantially cylindrical compartments 825 therein; two of the compartments 825 being respectively disposed between the bosses 806 and 807 and the adjacent upper and lower core members 818, and the other two of the compartments 825 being respectively disposed between the upper and lower core members 818 and the middle core member 818. Arranged within each compartment 825 is a substantially fluid-tight drum-shaped tank 826, provided with substantially flat parallel spaced-apart top and bottom walls 827 and 828 and a connecting substantially cylindrical side wall 829. Thus, in the arrangement illustrated, four tanks 826 are arranged in the four compartments 825. Preferably, the tanks 826 are identical; and in each tank 826 the top and bottom walls 827 and 828 are formed of ordinary steel, while the cylindrical side wall 829 is formed of stainless steel. Also, the top and bottom walls 827 and 828 of each tank 826 constitute in effect pole pieces with respect to the interior thereof, as explained more fully hereinafter.

Arranged within the second hollow magnetic structure defined by the second group of upstanding I-beams 805 are a plurality of substantially disk-shaped magnetic core members 830, disposed in vertically spaced-apart relation between the upper and lower yokes 802 and 803. In the arrangement illustrated, three core members 830 are disposed within the second hollow magnetic structure; and each of the core members 830 is retained in position by an arrangement including upper and lower substantially circular plates 831 and 832, respectively engaging the upper and lower surfaces of the core member 830 and respectively secured to the individual I-beams 805 by two groups of angular brackets 833 and 834. The diameter of each core member 830 is less than the internal diameter of the second hollow magnetic structure defined by the second group of I-beams 805, thereby to define a substantially annular space 835 mutually between the periphery of the core member 830 and the inner edges of the upstanding I-beams 805 and between the upper and lower plates 831 and 832; in which space there is arranged a substantially tubular winding coil 836. Thus, each winding coil 836 embraces the associated core member 830 and is retained in position between the associated upper and lower plates 831 and 832 in engagement with the inner edges of the upstanding I-beams 805. The three windings 836 carried by the three core members 830 are connected in series circuit relationship in order to set up magnetic flux in the field structure 801 in a manner more fully explained hereinafter.

The arrangement of the three core members 830 in vertically spaced-apart relation within the first hollow magnetic structure defines four upstanding substantially cylindrical compartments 837 therein; two of the compartments 837 being respectively disposed between the bosses 808 and 809 and the adjacent upper and lower core members 830, and the other two of the compartments 837 being respectively disposed between the upper and lower core members 830 and the middle core member 830. Arranged within each compartment 837 is a substantially fluid-tight drum-shaped tank 838, provided with substantially flat parallel spaced-apart top and bottom walls 839 and 840 and a connecting substantially cylindrical side wall 841. Thus, in the arrangement illustrated, four tanks 838 are arranged in the four compartments 837. Preferably, the tanks 837 are identical; and in each tank 837 the top and bottom walls 839 and 840 are formed of ordinary steel, while the cylindrical side wall 841 is formed of stainless steel. Also, the top and bottom walls 839 and 840 of each tank 838 constitute in effect pole pieces with respect to the interior thereof, as explained more fully hereinafter.

In view of the foregoing explanation of the construction and arrangement of the field structure 801, it will be understood that the first hollow magnetic structure defined by the first group of I-beams 804 between the upper and lower yokes 802 and 803 houses a plurality of substantially fluid-tight tanks 826, arranged in vertically spaced-apart relation with respect to each other and a plurality of core members 818, arranged in vertically spaced-apart relation with respect to each other and in interposed relation with respect to the tanks 826; while the second hollow magnetic structure defined by the second group of I-beams 805 between the upper and lower yokes 802 and 803 houses a plurality of substantially fluid-tight tanks 838, arranged in vertically spaced-apart relation with respect to each other and a plurality of core members 830, arranged in vertically spaced-apart relation with respect to each other and in interposed relation with respect to the tanks 838.

When the windings 824 carried by the core members 818 are energized, magnetic flux is set up in the field structure 801 extending upwardly through the first hollow magnetic structure comprising the first group of I-beams 804 and the inner and outer plates 810 and 811, into the marginal portion of the boss 806 carried by the left-hand end of the upper yoke 802. This magnetic flux continues from the marginal portion of the boss 806 inwardly toward the center thereof, and then downwardly through the tanks 826 and the core members 818 in series relation into the central portion of the boss 807 carried by the left-hand end of the lower yoke 803. Further, the major portion of this magnetic flux continues from the central portion of the boss 807 outwardly toward the marginal portion thereof, and then upwardly into the first hollow magnetic structure mentioned, thereby to complete the magnetic circuit; while a minor portion of this magnetic flux continues from the central portion of the boss 807 toward the marginal portion thereof, and then across the central portion of the lower yoke 803 into the boss 809 carried by the right-hand end of the lower yoke 803. Similarly, when the windings 836 carried by the core members 830 are energized, magnetic flux is set up in the field structure 801 extending downwardly through the second hollow magnetic structure comprising the second group of I-beams 905 and the inner and outer plates 814 and 815 into the marginal portion of the boss 809 carried by the right-hand end of the lower yoke 803. This magnetic flux continues from the marginal portion of the boss 809 inwardly toward the center thereof, and then upwardly through the tanks 838 and the core members 830 in series relation into the central portion of the boss 808 carried by the right-hand end of the upper yoke 802. Further, the major portion of this magnetic flux continues from the central portion of the boss 808 outwardly toward the marginal portion thereof and then downwardly into the second hollow magnetic structure mentioned, thereby to complete the magnetic circuit; while a minor portion of this magnetic flux continues from the central portion of the boss 808 outwardly toward the marginal portion thereof, and then across the central portion of the upper yoke 802 into the boss 806 carried by the left-hand end of the upper yoke 802. Accordingly, the major portion of the magnetic flux traversing the tanks 826 and the core members 818 is provided with a return path including the first hollow magnetic structure, and the major portion of the magnetic flux traversing the tanks 838 and the core members 830 is provided with a return path including the second hollow magnetic structure. However, the minor portion of the magnetic flux traversing the tanks 826 and the core members 818 constitutes the minor portion of the magnetic flux traversing the tanks 838 and the core members 830, whereby the two groups of tanks 826 and 838 and the two individually associated groups of core members 818 and 830 are disposed in series circuit relation in the field structure 801 with respect to the minor portions of the magnetic flux mentioned.

In the field structure 801, the magnetic flux entering the top wall 827 of any individual first tank 826 is distributed thereby substantially uniformly and permeates the tank space therein, entering the bottom wall 828 of the first tank 826 and continuing into the adjacent core member 818, and thence into the top wall 827 of the adjacent individual second tank 826 disposed therebelow; while the magnetic flux entering the bottom wall 840 of any individual first tank 838 is distributed thereby substantially uniformly and permeates the tank space therein, entering the top wall 839 of the first tank 838 and continuing into the adjacent core member 830, and thence into the bottom wall 840 of the adjacent individual second tank 838 disposed thereabove.

Also, the calutron 800 comprises vacuum pumping apparatus 842 commonly associated with the two vertical rows of tanks 826 and 838, whereby the interior of each individual tank 826 or 838 may be evacuated to a pressure of the order of $10^{-5}$ to $10^{-4}$ mm. Hg. More particularly, the vacuum pumping apparatus 842 is arranged exteriorly of the field structure 801 and is connected to an upstanding header 843 extending through an opening formed in the lower yoke 803 into the interior of the field structure 801 between the two hollow magnetic structures respectively defined by the two groups of I-beams 804 and 805. The tanks 826 and 838 in the two vertical rows are operatively connected to the upstanding header 843 by a conduit arrangement including a plurality of manually operable valves 844 individual to the tanks 826 and 838, whereby each of the individual tanks 826 and 838 may be selectively connected to and disconnected from the associated upstanding header 843 by manipulation of the individually associated valve 844, which upstanding header 843 is evacuated by the vacuum pumping apparatus 842.

Finally, the calutron 800 comprises a plurality of ion beam transmitters 845 of the general construction and arrangement of the transmitter 20, and a plurality of ion beam receivers 846, supported in pairs and carried by plates 847, removably secured to the side walls 829 and 841 of the individual tanks 826 and 838, respectively. More particularly, the side wall 829 of each individual tank 826 is provided with two diametrically disposed openings formed therein, which are arranged in alignment with the two diametrically disposed openings 812 and 813 formed in the first hollow magnetic structure; which openings are closed by two of the plates 847 each carrying one of the transmitter-receiver pairs 845—846. Thus, each of the individual tanks 826 houses two of the transmitter-receiver pairs 845—846 respectively carried by the two plates 847 secured to the side wall 829 thereof in alignment with respect to the openings 812 and 813 formed in the first hollow magnetic structure; whereby the two plates 847 respectively carrying the two transmitter-receiver pairs 845—846 may be readily removed from the side wall 829 of the individual tank 826 through the respective openings 812 and 813 formed in the first hollow magnetic structure when it is necessary to adjust or repair one of the elements of the associated transmitter-receiver pair 845—846. Similarly, the side wall 841 of each individual tank 838 is provided with two diametrically disposed openings formed therein, which are arranged in alignment with the two diametrically disposed openings 816 and 817 formed in the second hollow magnetic structure; which openings are closed by two of the plates 847 each carrying one of the transmitter-receiver pairs 845—846. Thus, each of the individual tanks 838 houses two of the transmitter-receiver pairs 845—846 respectively carried by the two plates 847 secured to the side wall 841 thereof in alignment with respect to the openings 816 and 817 formed in the second hollow magnetic structure; whereby the two plates 847 respectively carrying the two transmitter-receiver pairs 845—846 may be readily removed from the side wall 841 of the individual tank 838 through the respective openings 816 and 817 formed in the second hollow magnetic structure when it is necessary to adjust or repair one of the elements of the associated transmitter-receiver pair 845—846.

In each of the tanks 826 and 838, the two transmitter-receiver pairs 845—846 are cross-matched, whereby the transmitter 845 of one pair supported by one of the plates 847 is matched with the receiver 846 of the other pair supported by the other plate 847. Thus it will be understood that the two transmitters 845 transmit two ion beams to the two matched receivers 846 in each of the tanks 826 and 838.

Of course, it will be understood that the general principle of operation of the calutron 800 is the same as that of the calutron 10, each transmitter 845 transmitting an ion beam through the evacuated space in the associated tank 826 or 838, transversely of the magnetic field traversing this tank space, to the receiver 846; the respective lighter and heavier isotopes of the element treated are disposed at the inner and outer boundaries of the ion beam adjacent the receiver 846, whereby the respective lighter and heavier isotopes of the element treated are respectively collected in the two pockets of the receiver 846; all in the manner previously explained.

As previously noted, any one of the plates 847 may be removed from the associated side wall 829 or 841 of the individual tank 826 or 838 through the associated opening 812 or 813 in the first hollow magnetic structure, or through the associated opening 816 or 817 in the second hollow magnetic structure, when it is necessary to gain access to the interior of the tank 826 or 838. Of course it will be understood that before any one of the plates 847 is removed from the side wall of the associated tank 826 or 838, this tank 826 or 838 is disconnected from the associated header 843 by closing the valve 844 individual thereto. Finally, it will be understood that an operator may readily replace, in a reverse manner, in any one of the tanks 826 or 838 a transmitter-receiver pair 845—846 and again connect the tank 826 or 838 to the associated header 843 for further operation.

In view of the foregoing description of the construction and arrangement of the calutron 800 in conjunction with the mode of operation thereof, it will be understood that in the field structure 801 great economy is made of space by virtue of the compact arrangement of the tanks 826 and 838 and the core members 818 and 830 therein. Accordingly, the calutron 800 has an isotope separating capacity of the order of sixteen times that of the calutron 10, although it is only of somewhat larger dimensions and requires only somewhat larger associated vacuum pumping apparatus. Moreover, in the calutron 800 the equipment commonly associated with the individual tanks 826 and 838, such for example as the vacuum pumping apparatus 842, is utilized very efficiently in view of the fact that this common equipment may be operated continuously, in spite of the fact that one or more of the individual tanks 826 or 838 has been removed from operation in the system for the purpose of adjustment or repair.

Referring now more particularly to Figs. 10 to 12, inclusive, of the drawings, there is illustrated a calutron 1000 embodying the features of the present invention and comprising field structure 1001 including front and rear substantially parallel laterally extending magnetic yokes 1002 and 1003, arranged in longitudinally spaced-apart relation, and two substantially parallel longitudinally extending rows of magnetic core members 1004, disposed between the yokes 1002 and 1003 and arranged in laterally spaced-apart relation with respect to each other. As best shown in Fig. 10, the left-hand row of core members 1004, as well as the right-hand row of core members 1004, comprises six individual core members 1004, arranged in longitudinally spaced-apart relation.

Also, the calutron 1000 comprises two substantially parallel longitudinally extending rows of substantially fluid-tight tanks 1005 disposed between the yokes 1002 and 1003 and arranged in laterally spaced-apart relation with respect to each other. As best shown in Fig. 10, the left-hand row of tanks 1005, as well as the right-hand row of tanks 1005, comprises five individual tanks 1005, arranged in longitudinally spaced-apart relation. More particularly, the five tanks 1005 in the left-hand row are arranged in interposed relation with respect to the six core members 1004 in the left-hand row, thereby to provide a consolidated left-hand row of core members 1004 and tanks 1005 extending between the left-hand ends of the yokes 1002 and 1003. Similarly, the five tanks 1005 in the right-hand row are arranged in interposed relation with respect to the six core members 1004 in the right-hand row, thereby to provide a consolidated right-hand row of core members 1004 and tanks 1005 extending between the right-hand ends of the yokes 1002 and 1003.

Preferably, the tanks 1005 are identical, each being substantially rectangular in vertical section and each comprising a pair of substantially flat upstanding side walls 1006 arranged in substantially parallel longitudinally spaced-apart relation, a pair of flat upstanding end walls 1007 arranged in substantially parallel laterally spaced-apart relation, and flat top and bottom walls 1008 and 1009 arranged in substantially parallel vertically spaced-apart relation. Preferably, in each tank 1005, the side walls 1006 are formed of ordinary steel; while the end walls 1007, as well as the top and bottom walls 1008 and 1009, are formed of stainless steel. Also, the side walls 1006 constitute in effect pole pieces with respect to the interior of the tank 1005, as explained more fully hereinafter.

Preferably, the core members 1004 are identical, each being substantially rectangular in vertical section and each carrying an encompassing tubular casing 1010 in which there is housed a winding 1011. More particularly, each of the casings 1010 is substantially fluid-tight and includes top and bottom walls 1012 and 1013, the top wall 1012 carrying two oil inlet fixtures 1014 communicating with the interior of the casing 1010, and the bottom wall 1013 carrying an oil outlet fixture 1015 communicating with the interior of the casing 1010. The winding 1011 arranged in each casing 1010 comprises a number of layers of ribbon-like conductor, suitably insulated from each other and connected in series circuit relation between terminal structure, not shown. The different layers of the winding 1011 are arranged in spaced-apart relation in order to provide an open-work construction, whereby oil in the casing 1010 permeates the winding 1011 to facilitate insulation and cooling. It will be understood that the winding 1011 may be readily cooled by causing oil to be conducted through the casing 1010 via the oil inlet fixtures 1014 and the oil outlet fixture 1015.

The individual windings 1011 are arranged in series circuit relation, and when they are energized magnetic flux is set up in the field structure 1001 extending from the left-hand end of the rear yoke 1003 forwardly through the left-hand row of core members 1004 and tanks 1005 in series relation into the left-hand end of the front yoke 1002. The magnetic flux continues from the left-hand end of the front yoke 1002 to the right-hand end thereof, and then rearwardly through the right-hand row of core members 1004 and tanks 1005 in series relation into the right-hand end of the rear yoke 1003. Further, the magnetic flux continues from the right-hand end of the rear yoke 1003 to the left-hand end thereof, thereby to complete the magnetic circuit.

Thus, it will be understood that in the field structure 1001 the two rows of tanks 1005 and interposed core members 1004 are arranged in series magnetic circuit relation; and the magnetic flux entering one of the side walls 1006 of any individual first tank 1005 is distributed thereby substantially uniformly and permeates the tank space therein, entering the other side wall 1006 of the first tank 1005 and continuing through the adjacent core member 1004 into the side wall 1006 of the adjacent individual second tank 1005.

Also, the calutron 1000 comprises vacuum pumping apparatus including two vacuum pumping mechanisms 1016 and 1017, respectively commonly associated with the left-hand and right-hand rows of tanks 1005, whereby the interior of each tank 1005 may be evacuated to a pressure of the order of $10^{-5}$ to $10^{-4}$ mm. Hg. More particularly, the vacuum pumping mechanisms 1016 and 1017 are arranged exteriorly of the field structure 1001 and are respectively connected to two headers 1018 and 1019. The tanks 1005 in the left-hand row are operatively connected to the header 1018 by a conduit arrangement including a plurality of manually operable valves 1020, whereby each of the individual tanks 1005 in this row may be selectively connected to and disconnected from the associated header 1018 by manipulation of the individually associated valve 1020, which header 1018 is evacuated by the vacuum pumping mechanism 1016. Similarly, the tanks 1005 in the right-hand row are operatively connected to the header 1019 by a conduit arrangement including a plurality of manually operable valves 1021, whereby each of the individual tanks 1005 in this row may be selectively connected to and disconnected from the associated header 1019 by manipulation of the individually associated valve 1021, which header 1019 is evacuated by the vacuum pumping mechanism 1017.

Further, the calutron 1000 comprises a plurality of sets of ion beam transmitters 1022 of the general construction and arrangement of the transmitter 20, respectively carried by the top and bottom walls 1008 and 1009 of the individual tanks 1005 and housed therein; and a plurality of sets of ion beam receivers 1023 respectively carried by the top and bottom walls 1008 and 1009 of the individual tanks 1005 and housed therein. In the arrangement illustrated in Fig. 11, both the top wall 1008 and the bottom wall 1009 of the individual tank 1005 shown carry a set of five individual transmitters 1022 and five individual receivers 1023, arranged in matched pairs. Thus, the top wall 1008, as well as the bottom wall 1009, carries five transmitter-receiver pairs 1022—1023. Of course it will be understood that the general principle of operation of the calutron 1000 is the same as that of the calutron 10, each transmitter 1022 transmitting an ion beam through the evacuated space in the associated tank 1005 to the associated receiver 1023; the respective lighter and heavier isotopes of the element treated are disposed at the inner and outer boundaries of the ion beam adjacent the receiver 1023, whereby the respective lighter and heavier isotopes of the element treated are respectively collected in the two pockets of the receiver 1023; all in the manner previously explained.

Reconsidering the construction and arrangement of the calutron 1000 with reference to its support, it is pointed out that the calutron 1000 is housed in a suitable building 1024 including a floor 1025, front and rear walls 1026 and 1027, and a ceiling 1028. The floor 1025 of the building 1024 rests upon four supporting members 1029 which are adapted to carry the weight of the calutron 1000. As best illustrated in Fig. 11, the four supporting members 1029 extend longitudinally and are arranged in laterally spaced-apart relation, whereby a supporting member 1029 is disposed adjacent each marginal edge of each longitudinal row of core members 1004 and tanks 1005. The casings 1010 surrounding the core members 1004 rest directly upon the floor 1025 and primarily upon the supporting members 1029, while the tanks 1005 rest upon pairs of supporting brackets 1030 secured to the floor 1025 over the supporting members 1029, whereby the weight of the tanks 1005 is carried by the supporting members 1029.

Each of the tanks 1005 is removably supported upon the associated pair of brackets 1030 and is adapted to be lifted from a normal position disposed between the two adjacent core members 1004 vertically through an opening 1031 formed in the ceiling 1028. It will be understood that each individual tank 1005 is lifted from its normal position through the associated opening 1031 in the ceiling 1028 by suitable mechanism, not shown, carried above the ceiling 1028; and to facilitate lifting of the tank 1005 as explained, two hooks 1032 are respectively secured to the end walls 1007 thereof. Thus, it will be understood that any individual tank 1005 may be readily removed from or replaced in its normal position utilizing the lifting mechanism, not shown. The opening 1031 formed in the ceiling 1028 and associated with each individual tank 1005 is adapted normally to be closed by a removable door 1033 which may be lifted out of position in any suitable manner.

Further, it is noted that after any one of the individual tanks 1005 has been lifted out of its normal position between the two adjacent core members 1004 through the associated opening 1031 formed in the ceiling 1028 to a position above the ceiling 1028, either the top wall 1008 or the bottom wall 1009 thereof may be removed individually, thereby to gain access to the interior of the individual tank 1005 in order to make necessary adjustment or repair of any one of the elements of the various transmitter-receiver pairs 1022—1023 carried thereby. Of course it will be understood that before any one of the individual tanks 1005 is removed from its normal position between the two associated core members 1004, this tank 1005 is disconnected from the associated header 1018 or 1019 by closing the valve 1020 or 1021 individual thereto. Finally, it will be understood that an operator may readily replace, in a reverse manner, any one of the individual tanks 1005 and again connect the tank 1005 to the associated header 1018 or 1019 for further operation.

In view of the foregoing description of the construction and arrangement of the calutron 1000 in conjunction with the mode of operation thereof, it will be understood that in the field structure 1001 great economy is made of space by virtue of the compact arrangement of the tanks 1005 and the core members 1004 therein. Accordingly, the calutron 1000 has an isotope separating capacity of the order of one hundred times that of the calutron 10, although it is only of somewhat larger dimensions and requires only somewhat larger associated vacuum pumping apparatus. Moreover, in the calutron 1000 the equipment commonly associated with the individual tanks 1005, such for example as the vacuum pumping mechanisms 1016 and 1017, is utilized very efficiently, in view of the fact that this common equipment may be operated continuously in spite of the fact that one or more of the tanks 1005 has been removed from operation in the system for the purpose of adjustment or repair.

Referring now more particularly to Fig. 13 of the drawings, there is illustrated a calutron 1300, embodying the features of the present invention and comprising field structure 1301 including a plurality of magnetic core members 1302 disposed along radii of a circle of given radius and spaced-apart along the periphery thereof. Also, the calutron 1300 includes a plurality of tanks 1303 disposed between the core members 1302 along radii of the circle and along the periphery of the circle of given radius. Thus, the field structure 1301 is in the form of a closed geometric figure, and in the arrangement illustrated six individual tanks 1303 and six individual core members 1302 are provided. Specifically, the center lines of the tanks 1303 are disposed radially with respect to the center of the circle approximately 60° apart, and the center lines of the core members 1302 are disposed radially with respect to each other approximately 60° apart, whereby the center line of each core member 1302 is disposed approximately 30° from each of the center lines of the two adjacent tanks 1303, due to the interposed position of each core member 1302 with respect to the two associated tanks 1303.

Preferably, the core members 1302 are substantially identical, each being substantially wedge-shaped and including a central body portion 1304 and two outwardly directed or flared pole-shoe portions 1305, whereby each core member 1302 is also substantially saddle-shaped. The two pole faces of the two pole-shoe portions 1305 of each core member 1302 are disposed respectively adjacent the two tanks 1303 between which the core member 1302 is interposed; and the body portion 1304 of each core member 1302 carries a substantially fluid-tight casing 1306 housing a winding, not shown. Due to the saddle shape of each core member 1302, the body portion 1304 thereof is of considerably less depth than the pole-shoe portions 1305 thereof, whereby the casing 1306 carried by the body portion 1304 is of corresponding appropriate dimensions, effecting a considerable saving in material.

Preferably, the tanks 1303 are identical, each being substantially rectangular in vertical section and comprising side walls formed of ordinary steel and top and bottom and end walls formed of stainless steel. Further, each of the tanks 1303 houses one or more transmitter-receiver pairs, not shown; and it is preferable that the general construction and organization of both the component parts of each tank 1303 and the transmitter-receiver pairs housed therein are the same as disclosed in conjunction with each tank 1005 in the calutron 1000. Also, each of the tanks 1303 is supported upon a pair of brackets 1307 constructed and arranged in a manner substantially identical to the brackets 1030 utilized to support each tank 1005 in the calutron 1000. Further, each of the tanks 1303 is provided with a pair of hooks 1308, carried by the end walls thereof and constructed and arranged in a manner substantially identical to the hooks 1032 carried by the end walls of each tank 1005 in the calutron 1000.

Preferably, the casing 1306 carried by the body portions 1304 of the core members 1302 are identical, each being substantially fluid-tight and the component parts thereof being formed of steel. Also, it is preferable that the general construction and organization of the casings 1306 and the windings housed therein are the same as disclosed in conjunction with the casings 1010 and the windings 1011 housed therein which are carried by the core members 1004 in the calutron 1000. Also, each of the casings 1306 carries two oil inlet fixtures 1309 and an oil outlet fixture, not shown, communicating with the interior of the casing 1306 and constructed and arranged in a manner substantially identical to the oil inlet fixtures 1014 and the oil outlet fixture 1015 carried by the casing 1010 supported by the core member 1004 in the calutron 1000.

The calutron 1300 is housed in a suitable building 1310 including a floor 1311, and front and rear walls 1312 and 1313; and it is preferable that the general construction and organization of the component parts of the building 1310 are the same as the building 1024 housing the calutron 1000. For example, the floor 1311 is appropriately reinforced in order to carry the weight of the core members 1302 and the tanks 1303 as well as the other component parts of the calutron 1300. Also, the calutron 1300 comprises vacuum pumping apparatus 1314 commonly associated with the tanks 1303, whereby the interior of each individual tank 1303 may be evacuated to a pressure of the order of $10^{-5}$ to $10^{-4}$ mm. Hg. More particularly, the vacuum pumping apparatus 1314 is disposed at the center of the circle about which the core members 1302 and the tanks 1303 are arranged; and the tanks 1303 are connected thereto by a conduit arrangement including a plurality of manually operable valves 1315 individual to the tanks 1303, whereby each of the individual tanks 1303 may be selectively connected to and disconnected from the vacuum pumping apparatus 1314 by manipulation of the individually associated valve 1315.

The windings housed in the casings 1306 are connected in series circuit relation; and when these windings are energized magnetic flux is set up in the field structure 1301, traversing the core members 1302 and the tanks 1303 in series magnetic circuit relation. Specifically, magnetic flux extends through the body portion 1304 of a first core member 1302 and spreads out into the associated pole-shoe portion 1305 thereof, then traverses the adjacent tank 1303, entering the pole-shoe portion 1305 of the adjacent second core member 1302, and is then concentrated into the body portion 1304 of the second core member 1302, etc. The magnetic flux from the pole face of a first core member 1302 entering one of the side walls of any individual tank 1303 is distributed thereby substantially uniformly and permeates the tank space therein, entering the other side wall of the tank 1303 and continuing into the pole face of the associated second core member 1302.

Of course, it will be understood that the general principle of operation of the calutron 1300 is the same as that of the calutron 10 and substantially identical to that of the calutron 1000, whereby the respective lighter and heavier isotopes of the element treated are respectively collected in the two pockets of each receiver; all in the manner previously explained. Further, it will be understood that the removal and replacement of the tanks 1303 with respect to their normal positions adjacent the associated core members 1302 are the same as explained in conjunction with the removal and replacement of the tanks 1005 with respect to their normal positions adjacent the associated core members 1004 in the calutron 1000. Finally, it is noted that the calutron 1300 incorporates substantially all of the advantageous features of construction, arrangement, and operation of the calutron 1000, as well as the additional feature than an even greater economy of operation is obtained in the arrangement of the core members 1302 and the tanks 1303 in a closed geometric figure. The last-mentioned arrangement, wherein the core members 1302 and the tanks 1303 are substantially uniformly distributed throughout the field structure 1301, is very advantageous in that it greatly facilitates removal and replacement of the individual tanks 1303 for purposes of adjustment and repair.

Referring now more particularly to Figs. 14 to 16, inclusive, of the drawings, there is illustrated a calutron 1400, embodying the features of the present invention and comprising field structure 1401 including a plurality of magnetic core members 1402 disposed in spaced-apart relation with respect to each other and arranged in a substantially oval array. More particularly, the field structure 1401 is in the form of a closed geometric figure comprising two longitudinally extending substantially parallel laterally spaced-apart side portions 1401a, two laterally extending substantially parallel longitudinally spaced-apart end portions 1401b, and four curved portions 1401c; one of the curved portions 1401c being arranged between each side portion 1401a and the adjacent end portion 1401b, thus completing the closed geometric figure. More particularly, the core members 1402 are of two types, 1402a and 1402b, the core members 1402a being substantially regular blocks having substantially parallel spaced-apart pole faces and being arranged in the side portions 1401a and in the end portions 1401b of the field structure 1401, and the core members 1402b being substantially wedge-shaped blocks having angularly disposed pole faces and being arranged in the curved portions 1401c of the field structure 1401. In the arrangement illustrated, each of the side portions 1401a of the field structure 1401 comprises a fairly large number, greater than six, of core members 1402a; each of the end portions 1401b of the field structure 1401 comprises two core members 1402a; and each of the curved portions 1401c of the field structure 1401 comprises six core members 1402b.

Also, the calutron 1400 comprises a plurality of pairs of tanks 1403 disposed in spaced-apart relation with respect to each other and in interposed relation with respect to the core members 1402, each pair of tanks 1403 being arranged between the two adjacent core members 1402. Also, the tanks 1403 comprise inner tanks 1403a, arranged within the field structure 1401 interiorly of the center line thereof, and outer tanks 1403b, arranged within the field structure 1401 exteriorly of the center line thereof. Accordingly, the core members 1402 and the pairs of tanks 1403 are arranged alternately about the closed geometric figure.

Preferably, the core members 1402a are identical, each being substantially rectangular in vertical section and each carrying a substantially fluid-tight casing 1404 housing a winding 1405. Preferably, the casing 1404 carried by each core member 1402a and the winding 1405 housed therein are of the same general construction and arrangement as the casing 1010 carried by the core member 1004 and the winding 1011 housed therein disclosed in conjunction with the calutron 1000. Thus, the casing 1404 may be provided with oil inlet and outlet fixtures, not shown, for the purpose of insulating and cooling the winding 1405 housed in the casing 1404, all in the manner previously explained. Preferably, the core members 1402b are identical, each including a pair of angularly disposed pole faces substantially rectangular in end elevation and each carrying two substantially fluid-tight casings 1406, housing windings, not shown, and respectively disposed adjacent the pole faces thereof in close proximity to the two associated pairs of tanks 1403. Preferably, each casing 1406 carried by each core member 1402b and the winding housed therein are of the same general construction and arrangement as the casing 1404 carried by each core member 1402a and the winding 1405 housed therein. In this connection, it is pointed out that the winding 1405 housed in the casing 1404 carried by each core member 1402a in substantially twice as large with respect to its ability to produce magnetomotive force as the winding housed in each of the casings 1406 carried by each of the core members 1402b, in view of the fact that each of the core members 1402a carries only one casing 1404, while each of the core members 1402b carries two of the casings 1406.

Preferably, the inner and outer tanks 1403a and 1403b are identical, each being substantially rectangular in vertical section and comprise side walls formed of ordinary steel and top and bottom and end walls formed of stainless steel. Further, each of the tanks 1403 houses one or more ion beam transmitters 1407 and one or more ion beam receivers 1408 arranged in pairs; and it is preferable that the general construction and organization of both the component parts of each tank 1403 and the transmitter-receiver pairs 1407—1408 housed therein are the same as disclosed in conjunction with each tank 1005 in the calutron 1000. Further, the considerations with reference to the support of the individual core members 1402, the individual tanks 1403, and the other component parts of the calutron 1400, as well as the removal and replacement of each individual tank 1403 with respect to its normal position in the field structure 1401, are generally the same as disclosed in conjunction with the calutron 1000. However, the arrangement of the inner and outer tanks 1403a and 1403b in pairs in the field structure 1401 permits removal of the individual tanks 1403 in an even more simplified manner, in that the inner tanks 1403a may be removed inwardly in a horizontal direction with respect to the field structure 1401, in view of the general oval configuration thereof, while the outer tanks 1403b may be removed outwardly in a horizontal direction with respect to the field structure 1401, in view of the configuration thereof noted.

Also in the calutron 1400, it is preferable that in each inner tank 1403a the transmitter-receiver pair or pairs 1407—1408 housed therein is actually carried by the end wall disposed adjacent the interior of the field structure 1401; which end wall is removable with respect to the remainder of the inner tank 1403a inwardly in a horizontal direction with respect to the field structure 1401, carrying with it the transmitter-receiver pair or pairs 1407—1408. Similarly, in each outer tank 1403b the transmitter-receiver pair or pairs 1407—1408 housed therein is actually carried by the end wall disposed adjacent the exterior of the field structure 1401; which end wall is removable with respect to the remainder of the outer tank 1403b outwardly in a horizontal direction with respect to the field structure 1401, carrying with it the transmitter-receiver pair or pairs 1407—1408.

The calutron 1400 is housed in a suitable building, not shown, of the general construction and arrangement of the building 1024 disclosed in conjunction with the calutron 1000. Also, the calutron 1400 comprises vacuum pumping apparatus including a number of vacuum pumping mechanisms 1409 and 1410 associated with the individual tanks 1403, whereby the interior of each individual tank 1403 may be evacuated to a pressure of the order of $10^{-5}$ to $10^{-4}$ mm. Hg. More particularly, the vacuum pumping mechanism 1409 is illustrated as being disposed interiorly of the field structure 1401 and commonly connected to the inner tanks 1403a, disposed in the lower left-hand curved portion 1401c of the field structure 1401, by a conduit arrangement including a plurality of manually operable valves 1411 individual to the tanks 1403a mentioned, whereby each of these individual tanks 1403a may be selectively connected to and disconnected from the vacuum pumping mechanism 1409 by manipulation of the individually associated valve 1411. Similarly, the vacuum pumping mechanism 1410 is illustrated as being disposed exteriorly of the field structure 1401 and commonly connected to the outer tanks 1403b, disposed in the lower left-hand curved portion 1401c of the field structure 1401, by a conduit arrangement including a plurality of manually operable valves 1412 individual to the tanks 1403b mentioned, whereby each of these individual tanks 1403b may be selectively connected to and disconnected from the vacuum pumping mechanism 1410 by manipulation of the individually associated valve 1412.

The windings 1405 housed in the casings 1404, as well as the windings housed in the casings 1406 respectively carried by the core members 1402a and 1402b, are suitably energized in order to set up magnetic flux in the field structure 1401, traversing the core members 1402a and 1402b and the pairs of tanks 1403 in series magnetic circuit relation. Specifically, the magnetic flux from the pole face of a first core member 1402 enters the adjacent side walls of the inner and outer tanks 1403a and 1403b of the adjacent pair and is distributed thereby substantially uniformly and permeates the respective tank spaces therein, entering the other side walls of the inner and outer tanks 1403a and 1403b of the pair and continuing into the pole face of the associated second core member 1402, whereby the magnetic flux between each two adjacent core members 1402 extends through the interposed pair of tanks 1403a and 1403b in parallel magnetic circuit relation.

Of course it will be understood that the general principle of operation of the calutron 1400 is the same as that of the calutron 10 and substantially identical to that of the two calutrons 1000 and 1300, whereby the respective lighter and heavier isotopes of the element treated are respectively collected in the two pockets of each receiver 1408; all in the manner previously explained. Finally, it is noted that the calutron 1400 incorporates substantially all of the advantageous features of construction, arrangement, and operation of the calutrons 1000 and 1300, as well as the additional feature that an even greater economy of operation is obtained in the arrangement of the core members 1402 and the pairs of tanks 1403a and 1403b in a closed geometric figure. The last-mentioned arrangement, wherein the core members 1402 and the tanks 1403 are substantially uniformly distributed throughout the field structure 1401 is very advantageous, in that it greatly facilitates removal and replacement of the individual tanks 1403 for adjustment and repair.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. A calutron comprising a plurality of substantially fluid-tight tanks, magnetic field structure associated with said tanks and arranged to set up a magnetic field therethrough, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

2. A calutron comprising a plurality of substantially fluid-tight tanks, magnetic field structure associated with said tanks and arranged to set up a magnetic field therethrough, a header associated with said tanks, valve means for selectively connecting said tanks to said header, means for evacuating said header, a plurality of transmitters respectively disposed in said tanks and arranged to transmit a plurality of ion beams therein through said magnetic field, and a plurality of receivers respectively disposed in said tanks and arranged to receive said ion beams.

3. A calutron comprising a pair of magnetic yokes arranged in spaced-apart relation, a plurality of substantially fluid-tight tanks arranged between said yokes, means for setting up a magnetic field between said yokes through said tanks, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

4. A calutron comprising a plurality of substantially fluid-tight tanks, a winding surrounding said tanks and arranged when energized to set up a magnetic field therethrough, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

5. A calutron comprising a pair of magnetic yokes arranged in spaced-apart relation, hollow magnetic structure arranged between and retaining said yokes in position, a plurality of substantially fluid-tight tanks arranged between said yokes and within said structure, said yokes and said structure and said tanks providing a magnetic circuit, means for setting up a magnetic field in said magnetic circuit, said magnetic field passing through said tanks, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

6. A calutron comprising a plurality of substantially fluid-tight tanks, magnetic field structure associated with said tanks and arranged to set up a magnetic field through said tanks in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

7. A calutron comprising a pair of magnetic yokes arranged in spaced-apart relation, a plurality of substantially fluid-tight tanks arranged between said yokes, means for setting up a magnetic field between said yokes through said tanks in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

8. A calutron comprising a plurality of substantially fluid-tight tanks, a winding surrounding said tanks and arranged when energized to set up a magnetic field through said tanks in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

9. A calutron comprising a plurality of substantially fluid-tight tanks, magnetic field structure associated with said tanks and arranged to set up a magnetic field through said tanks in parallel relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

10. A calutron comprising a pair of magnetic yokes arranged in spaced-apart relation, a plurality of substantially fluid-tight tanks arranged between said yokes, means for setting up a magnetic field between said yokes through said tanks in parallel relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

11. A calutron comprising a plurality of substantially fluid-tight tanks, a winding surrounding said tanks and arranged when energized to set up a magnetic field through said tanks in parallel relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

12. A calutron comprising a pair of magnetic yokes arranged in spaced-apart relation, a plurality of substantially parallel rows of substantially fluid-tight tanks arranged between said yokes, means for setting up a magnetic field between said yokes including a corresponding plurality of parallel paths through said rows of tanks, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

13. A calutron comprising a pair of magnetic yokes arranged in spaced-apart relation, a plurality of substantially parallel rows of substantially fluid-tight tanks arranged between said yokes, a winding surrounding said rows of tanks and arranged when energized to set up a magnetic field between said yokes including a corresponding plurality of parallel paths through said rows of tanks, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

14. A calutron comprising a pair of magnetic yokes arranged in spaced-apart relation, hollow magnetic structure arranged between and retaining said yokes in position, a plurality of substantially parallel rows of substantially fluid-tight tanks arranged between said yokes and within said structure, said yokes and said structure and said rows of tanks providing a series-parallel magnetic circuit including a corresponding plurality of parallel paths through said rows of tanks, means for setting up a magnetic field in said magnetic circuit, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

15. A calutron comprising a pair of magnetic yokes arranged in spaced-apart relation, hollow magnetic structure arranged between and retaining said yokes in position, a plurality of substantially fluid-tight tanks arranged between said yokes and within said structure, whereby a space is provided mutually between said yokes and between said structure and said tanks, said yokes and said structure and said tanks providing a series magnetic circuit surrounding said space, means including a winding disposed in said space for setting up a magnetic field in said magnetic circuit, said winding surrounding said tanks and said magnetic field passing through said tanks in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

16. A calutron comprising a pair of magnetic yokes arranged in spaced-apart relation, hollow magnetic structure arranged between and retaining said yokes in position, a plurality of substantially parallel rows of substantially fluid-tight tanks arranged between said yokes and within said structure, whereby a space is provided mutually between said yokes and between said structure and said rows of tanks, said yokes and said structure and said rows of tanks providing a series-parallel magnetic circuit including a corresponding plurality of parallel paths through said rows of tanks and surrounding said space, means including a winding disposed in said space for setting up a magnetic field in said magnetic circuit, said winding surrounding said tanks and said magnetic field passing through said rows of tanks in parallel relation, means for evacuating said tanks, a plurality of transmitters respectively disposed in said tanks and arranged to transmit a corresponding plurality of ion beams therein through said magnetic field, and a plurality of receivers respectively disposed in said tanks and arranged to receive said ion beams.

17. A calutron comprising a plurality of substantially identical fluid-tight tanks arranged in vertically stacked relation, magnetic field structure associated with said tanks and arranged to set up a magnetic field through said tanks in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

18. A calutron comprising a plurality of substantially fluid-tight tanks, magnetic field structure including a core member disposed between each two adjacent tanks and arranged to set up a magnetic field through said tanks in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

19. A calutron comprising a plurality of substantially fluid-tight tanks, a plurality of interposed magnetic core members, means for setting up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

20. A calutron comprising a pair of magnetic yokes arranged in spaced-apart relation, a plurality of substantially fluid-tight tanks and a plurality of interposed magnetic core members arranged between said yokes, means for setting up a magnetic field between said yokes through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

21. A calutron comprising a pair of magnetic yokes arranged in spaced-apart relation, a plurality of substantially fluid-tight tanks and a plurality of interposed magnetic core members arranged in a plurality of substantially parallel rows between said yokes, means for setting up a magnetic field between said yokes including series paths through said rows of tanks and said core members, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

22. A calutron comprising a plurality of substantially fluid-tight tanks, a magnetic core member disposed between each two adjacent tanks, a winding carried by said core member and arranged when energized to set up a magnetic field through said tanks in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

23. A calutron comprising a plurality of substantially fluid-tight tanks, a plurality of interposed magnetic core members, a plurality of windings respectively carried by said core members and arranged when energized to set up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

24. A calutron comprising a pair of magnetic yokes arranged in spaced-apart relation, a plurality of substantially fluid-tight tanks and a plurality of interposed magnetic core members arranged between said yokes, means including a plurality of windings respectively carried by said core members for setting up a magnetic field between said yokes through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

25. A calutron comprising a plurality of substantially identical fluid-tight tanks and a plurality of interposed magnetic core members arranged in vertically stacked relation, means for setting up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

26. A calutron comprising a plurality of substantially identical fluid-tight tanks arranged in a horizontal row, magnetic field structure associated with said tanks and arranged to set up a magnetic field through said tanks in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

27. A calutron comprising a plurality of substantially identical fluid-tight tanks and a plurality of interposed magnetic core members arranged in a horizontal row, means for setting up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

28. A calutron comprising a plurality of substantially fluid-tight tanks, a plurality of interposed magnetic core members, a plurality of substantially fluid-tight casings respectively carried by said core members, a plurality of windings respectively housed in said casings and arranged when energized to set up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

29. A calutron comprising a plurality of substantially fluid-tight tanks, a plurality of interposed magnetic core members, a plurality of substantially fluid-tight casings respectively carried by said core members, a plurality of windings respectively housed in said casings and arranged when energized to set up a magnetic field through said tanks and said core members in series relation, means for circulating insulating and cooling fluid through said casings into contact with said windings housed therein, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

30. A calutron comprising a plurality of substantially fluid-tight tanks arranged to form a closed geometric figure, magnetic field structure associated with said tanks and arranged to set up a magnetic field through said tanks in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

31. A calutron comprising a plurality of substantially fluid-tight tanks and a plurality of interposed magnetic core members arranged to form a closed geometric figure, means for setting up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

32. A calutron comprising a plurality of substantially fluid-tight tanks and a plurality of interposed magnetic core members arranged to form a closed geometric figure, a plurality of windings respectively carried by said core members and arranged when energized to set up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

33. A calutron comprising a plurality of substantially fluid-tight tanks and a plurality of interposed magnetic core members arranged in a substantially circular array, means for setting up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

34. A calutron comprising a plurality of substantially fluid-tight tanks arranged in radially spaced-apart relation with respect to each other, a plurality of substantially wedge-shaped magnetic core members arranged in radially spaced-apart relation with respect to each other and in interposed relation with respect to said tanks, means for setting up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

35. A calutron comprising a plurality of substantially fluid-tight tanks arranged in radially spaced-apart relation with respect to each other, a plurality of substantially wedge-shaped magnetic core members arranged in radially spaced-apart relation with respect to each other and in interposed relation with respect to said tanks, a plurality of windings respectively carried by said core members and arranged when energized to set up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

36. A calutron comprising a plurality of substantially identical fluid-tight tanks arranged in radially spaced-apart relation with respect to each other about a circle, a plurality of substantially wedge-shaped magnetic core members arranged in radially spaced-apart relation with respect to each other about said circle and in interposed relation with respect to said tanks, a plurality of windings respectively carried by said core members and arranged when energized to set up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

37. A calutron comprising a plurality of substantially identical fluid-tight tanks and a plurality of interposed magnetic core members arranged to form a closed geometric figure having a generally oval configuration, a plurality of windings respectively carried by said core members and arranged when energized to set up a magnetic field through said tanks and said core members in series relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

38. A calutron comprising a plurality of pairs of substantially fluid-tight tanks arranged in spaced-apart relation with respect to each other, a plurality of magnetic core members arranged in spaced-apart relation with respect to each other and in interposed relation with respect to said pairs of tanks, means for setting up a magnetic field through said pairs of tanks and said core members, whereby the magnetic field between each two adjacent core members extends through the interposed pair of tanks in parallel relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

39. A calutron comprising a plurality of pairs of substantially fluid-tight tanks arranged in spaced-apart relation with respect to each other about a closed geometric figure, a plurality of magnetic core members arranged in spaced-apart relation with respect to each other about said closed geometric figure and in interposed relation with respect to said pairs of tanks, a plurality of windings respectively carried by said core members and arranged when energized to set up a magnetic field through said pairs of tanks and said core members, whereby the magnetic field between each two adjacent core members extends through the interposed pair of tanks in parallel relation, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

40. A calutron comprising a plurality of substantially fluid-tight tanks, a plurality of interposed magnetic core members, a plurality of pairs of winding coils respectively carried by said core members and arranged when energized to set up a magnetic field through said tanks and said core members in series relation, the two winding coils of the pair carried by each core member being disposed adjacent the opposite ends thereof and in proximity to the two adjacent tanks between which the core member is interposed, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

41. A calutron comprising a plurality of substantially fluid-tight tanks arranged radially in spaced-apart relation with respect to the center of a circle, a plurality of substantially wedge-shaped magnetic core members arranged radially in spaced-apart relation with respect to the center of the circle and in interposed relation with respect to said tanks, a plurality of pairs of winding coils respectively carried by said core members and arranged when energized to set up a magnetic field through said tanks and said core members in series relation, the two winding coils of the pair carried by each core member being disposed adjacent the opposite ends thereof and in proximity to the two adjacent tanks between which the core member is interposed, means for evacuating said tanks, a plurality of transmitters respectively disposed in said tanks and arranged to transmit a plurality of ion beams therein through said magnetic field, and a plurality of receivers respectively disposed in said tanks and arranged to receive said ion beams.

References Cited in the file of this patent

UNITED STATES PATENTS

| Number | Name | Date |
|---|---|---|
| 455,726 | Brown | July 7, 1891 |
| 1,657,574 | Hazeltine | Jan. 31, 1928 |
| 2,031,778 | Kuhle et al. | Feb. 25, 1936 |
| 2,035,756 | Nehlsen | Mar. 31, 1936 |
| 2,084,867 | Prinz et al. | June 22, 1937 |
| 2,096,817 | Malter et al. | Oct. 26, 1937 |
| 2,159,478 | Gerhard | May 23, 1939 |
| 2,221,467 | Bleakney | Nov. 12, 1940 |
| 2,233,779 | Fritz | Mar. 4, 1941 |
| 2,331,189 | Hipple | Oct. 5, 1943 |
| 2,331,934 | Satterlee | Oct. 19, 1943 |
| 2,370,673 | Langmuir | Mar. 6, 1945 |

OTHER REFERENCES

Bleakney—Physical Review, vol. 40, May 1932, pp. 496–498.

Oliphant et al.—Proceedings Royal Society of London, vol. 146A, 1934, pp. 922–929.

Smythe et al.—Physical Review, February 1, 1937, vol. 51, pp. 178–182.